US008516585B2

(12) United States Patent
Cao et al.

(10) Patent No.: US 8,516,585 B2
(45) Date of Patent: Aug. 20, 2013

(54) SYSTEM AND METHOD FOR DETECTION OF DOMAIN-FLUX BOTNETS AND THE LIKE

(75) Inventors: Jin Cao, Edison, NJ (US); Li Li, Edison, NJ (US); Nan Jiang, Minneapolis, MN (US)

(73) Assignee: Alcatel Lucent, Paris (FR)

( * ) Notice: Subject to any disclaimer, the term of this patent is extended or adjusted under 35 U.S.C. 154(b) by 310 days.

(21) Appl. No.: 12/897,494

(22) Filed: Oct. 4, 2010

(65) Prior Publication Data

US 2012/0084860 A1 Apr. 5, 2012

Related U.S. Application Data

(60) Provisional application No. 61/388,674, filed on Oct. 1, 2010.

(51) Int. Cl.
*G06F 21/00* (2006.01)
(52) U.S. Cl.
USPC ............... 726/23; 726/22; 726/24; 726/25; 713/187; 713/188; 713/193; 713/194
(58) Field of Classification Search
USPC .............. 726/22–25; 713/187–188, 193–194
See application file for complete search history.

(56) References Cited

U.S. PATENT DOCUMENTS

| 8,260,914 | B1 * | 9/2012 | Ranjan .......................... 709/224 |
|---|---|---|---|
| 8,407,471 | B1 * | 3/2013 | Sobel ............................ 713/168 |
| 2008/0046393 | A1 * | 2/2008 | Jajodia et al. .................. 706/50 |
| 2008/0301809 | A1 * | 12/2008 | Choi ............................... 726/23 |
| 2011/0283357 | A1 * | 11/2011 | Pandrangi et al. .............. 726/22 |

OTHER PUBLICATIONS

Zhao, Yao et al., "BotGraph: Large Scale Spamming Botnet Detection," Proceeding NSDI'09, Proceedings of the 6th USENIX symposium on Networked systems design and implementation @2009, 14 pages.

Gu, Guofei et al., "BotMiner: Clustering Analysis of Network Traffic for Protocol- and Structure-Independent Botnet Detection," Proceedings of the 17th USENIX Security Symposium (Security'08), San Jose, CA, 2008,16 pages.

Gu, Guofei et al., "BotSniffer: Detecting Botnet Command and Control Channels in Network Traffic," Proceedings of the 15th Annual Network and Distributed System Security Symposium (NDSS'08), San Diego, CA, Feb. 2008, 18 pages.

(Continued)

*Primary Examiner* — David Pearson
*Assistant Examiner* — Josnel Jeudy
(74) *Attorney, Agent, or Firm* — Mendelsohn, Drucker & Associates, P.C.

(57) ABSTRACT

In one embodiment, a method for detecting malicious software agents, such as domain-flux botnets. The method applies a co-clustering algorithm on a domain-name query failure graph, to generate a hierarchical grouping of hosts based on similarities between domain names queried by those hosts, and divides that hierarchical structure into candidate clusters based on percentages of failed queries having at least first- and second-level domain names in common, thereby identifying hosts having correlated queries as possibly being infected with malicious software agents. A linking algorithm is used to correlate the co-clustering results generated at different time periods to differentiate actual domain-flux bots from other domain-name failure anomalies by identifying candidate clusters that persist for relatively long periods of time. Persistent candidate clusters are analyzed to identify which clusters have malicious software agents, based on a freshness metric that characterizes whether the candidate clusters continually generate failed queries having new domain names.

20 Claims, 14 Drawing Sheets

(56) References Cited

OTHER PUBLICATIONS

Ding, Chris et al., "Orthogonal Nonnegative Matrix TriFactorizations for Clustering," Journal Information Processing and Management: an International Journal, vol. 45 Issue 3, May 2009, 10 pages.

Plonka, David et al., "Context-aware Clustering of DNS Query Traffic," IMC'08, Oct. 20-22, 2008, Vouliagmeni, Greece, 13 pages.

Villamarín-Salomón, Ricardo and Brustoloni, José Carlos, "Identifying Botnets Using Anomaly Detection Techniques Applied to DNS Traffic," Consumer Communications and Networking Conference 2008, Jan. 10-12, 2008, 5th IEEE, pp. 476-481.

Zdrnja, Bojan et al., "Passive Monitoring of DNS Anomalies," Fourth GI International Conference on Detection of Intrusions & Malware, and Vulnerability Assessment (DIMVA), vol. 4579, pp. 129-139, 2007.

Holz, Thorsten et al., "Measuring and Detecting Fast-Flux Service Networks," 16th Annual Network & Distributed System Security Symposium, NDSS Symposium 2008, Feb. 8-11, 2008, 12 pages.

Karasaridis, Anestis et al., "Wide-scale Botnet Detection and Characterization," HotBots '07, 4th USENIX Symposium on Networked Systems Design & Implementation (NSDI '07), Apr. 11-13, 2007, 8 pages.

Dhillon, Inderjit S. et al., "Information Theoretic Coclustering," SIGKDD '03, Aug. 24-27, 2003, Washington, DC, USA. Copyright 2003, 10 pages.

Xie, Yinglian et al., "Spamming Botnets: Signatures and Characteristics," SIGCOMM'08, Aug. 17-22, 2008, Seattle, Washington, USA. Copyright 2008, 12 pages.

Villamarín-Salomón, Ricardo et al., "Bayesian Bot Detection Based on DNS Traffic Similarity," SAC'09, Mar. 8-12, 2009, Honolulu, Hawaii, U.S.A. Copyright 2009, 7 pages.

Holz, Thorsten et al., "Measurements and Mitigation of Peer-to-Peer-based Botnets: A Case Study on StormWorm," LEET '08 Proceedings of the 1st Usenix Workshop on Large-Scale Exploits and Emergent Threats, 2008, 9 pages.

Hu, Xin et al., "RB-Seeker: Auto-detection of Redirection Botnets," NDSS Symposium 2009, 16th Annual Network & Distributed System Security Symposium, Feb. 8-11, 2009, 17 pages.

\* cited by examiner

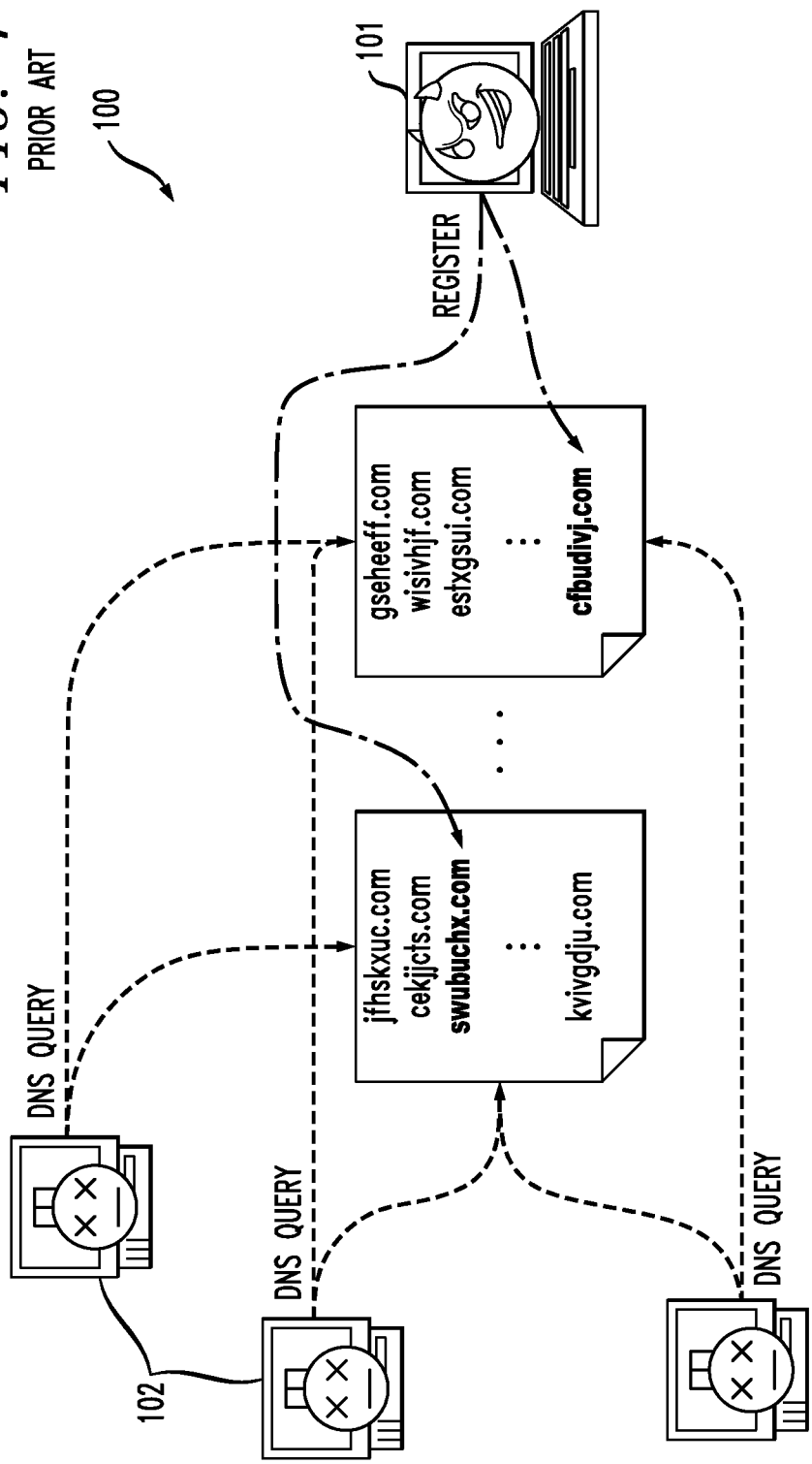

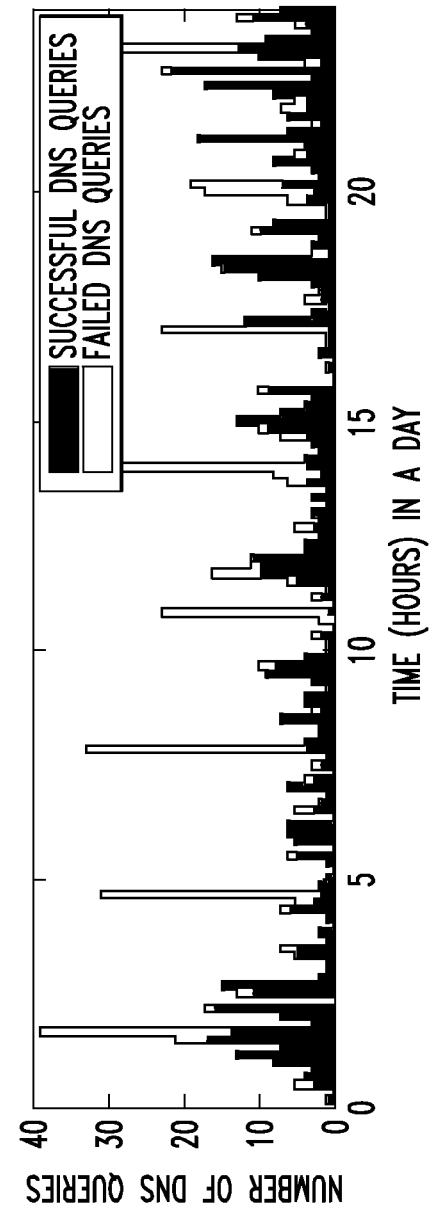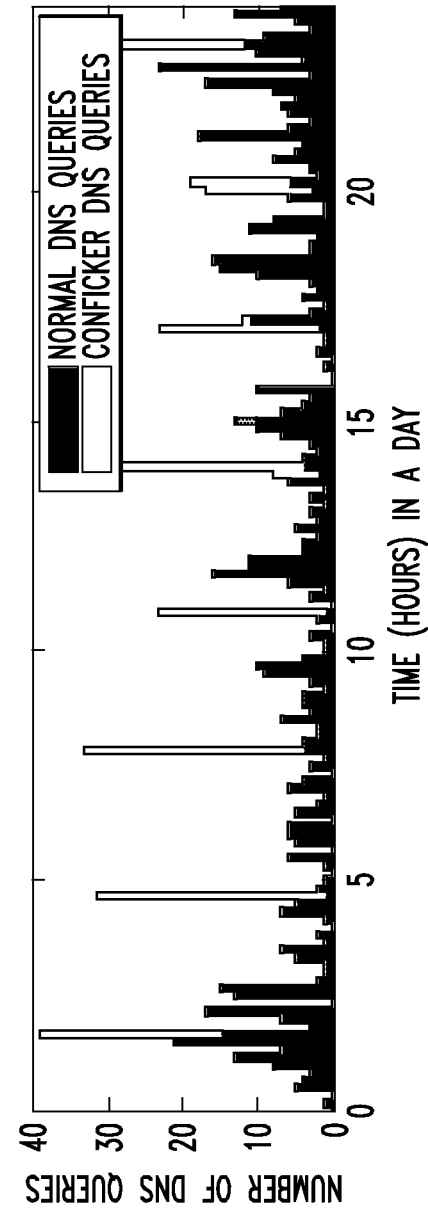
FIG. 3(a)
FIG. 3(b)

SYSTEM AND METHOD FOR DETECTION OF DOMAIN-FLUX BOTNETS AND THE LIKE

CROSS-REFERENCE TO RELATED APPLICATION

This application claims priority to U.S. Provisional Patent Application Ser. No. 61/388,674, filed Oct. 1, 2010, the disclosure of which is incorporated herein by reference in its entirety.

BACKGROUND OF THE INVENTION

1. Field of the Invention

The present invention relates generally to networks, and more particularly, to the detection of malicious software agents, such as botnets.

2. Description of the Related Art

A botnet is a collection of software agents or robots that run autonomously and automatically, without human intervention. In the context of the Internet, the term "botnet" or "botnet network" typically refers to a collection or network of malicious software agents, known as "bots," that are specifically designed to install themselves silently on a user's computer, without the user's knowledge. Such bots, which tend to be delivered through an ordinary web browser or email program, e.g., via viruses, worms, Trojan horses, backdoors, or other vulnerabilities, infect ordinary users' computers and usually have some malicious purpose, such as sending out spam email messages or performing a denial-of-service (DoS) attack against a particular target server or computer system. Once the bots are installed on users' computers, the originator of the botnet, referred to as the "bot master," can remotely control the bots to effect nefarious activities. Such control is managed via a server known as the command-and-control (C&C) server, and unique encryption schemes are often used to keep the presence of the bots and their activities secret, as well as to protect against intrusion into the botnet network.

Once a C&C server has been discovered and identified, security measures can be taken to prevent the botnet originator from controlling the corresponding bots, such as by shutting down or blocking access to the C&C server once its Internet Protocol (IP) address has been identified. However, recently, in an effort to make botnets even more robust, the authors of botnet software have begun creating botnets that are harder to identify, detect, and stop.

One such type of botnet used by bot masters, known as a "fast-flux" botnet, is more flexible and robust against takedown actions. In this scheme, the bots use domain-name servers (DNSs), i.e., computers that resolve domain names to their appropriate hosts, to query a certain domain that is mapped onto a set of IP addresses that changes frequently. This makes it more difficult to take down or block a specific C&C server. However, this scheme uses only a single domain, which presents a single point of failure.

An even more robust type of botnet, known as a "domain-flux botnet," has recently emerged, which overcomes the drawbacks of fast-flux botnets. Domain-flux botnets are botnets that maintain a communication channel between the bots and the C&C server through periodic domain-name registrations and queries. Since the domain name and corresponding IP address of the C&C server in a domain-flux botnet scheme constantly change, it can be relatively challenging to detect and thwart domain-flux botnets.

FIG. 1 illustrates graphically an example of a domain-flux botnet 100, which includes a C&C server 101 and a plurality of bots 102. The bot master uses a domain-generation algorithm (DGA), which creates lists of domain names from a random seed (usually the date in conjunction with some passcode). Using the DGA algorithm, the bot master pre-computes a plurality of domain-name lists and then randomly registers one or more domain names from the lists through a domain-name registrar. Each bot 102 in botnet 100 is equipped with the same DGA algorithm and periodically re-computes a list of domain names corresponding to the known seed. Not all domain names on the lists that are generated by the DGA algorithm will actually be registered by the bot master, who generally uses anonymous means to register the domain names with a domain-name registrar. Accordingly, each bot 102 must proceed through the domain names in the list, either sequentially or in a random order, performing queries on domain-name servers (DNS) in an attempt to locate domain names in the list that are registered. Thus, if a domain name is blocked (e.g., suspended by the registrar due to reported malicious activities), bot 102 can still find a valid domain name as long as there are other valid domain names in the list. Typically, after many DNS-query failures due to unregistered or blocked domain names, bot 102 eventually reaches a valid domain name that has been registered by the bot master. At that point, the response returned from the DNS query will contain the current IP address of C&C server 101. Bot 102 can then communicate with C&C server 101 to download commands and updates or to upload certain confidential information collected from the infected host computer on which bot 102 resides.

Due to the periodic updates of both the IP address and the domain name for C&C server 101, it is difficult for the network administrator to block the botnet or track the location of C&C server 101. Examples of domain-flux botnets are the Conficker-A, Conficker-B, and Torpig botnets, all of which employ DGA algorithms to compute domain-name lists. It is estimated that over 5 million machines are infected with various versions of the Conficker botnets, serving as bots.

The most commonly used approach for detecting domain-flux botnets is to capture domain-flux bots via a "honeypot," which is a closely-monitored computing resource that can perform various functions, including providing early warnings about new vulnerabilities and exploitation techniques, serving as a decoy to distract attackers from more valuable computer systems, and permitting in-depth examination of attackers and malicious software used by attackers. Once the honeypot is infected with the bot software, the DGA algorithm can be deciphered through reverse engineering. When the DGA algorithm is revealed, the bots can be detected by matching the DNS queries with the pre-computed domain-name lists, and the botnets can even be taken over by registering all the domain names in the list before the bot master has a chance to do so. Such reverse engineering involves a huge amount of manual work and hence cannot keep up with the emergence of new domain-flux botnets, which have now become one of the major threats to the Internet community.

SUMMARY OF THE INVENTION

Problems in the prior art are addressed in accordance with the principles of the present invention by providing a system and method for detecting domain-flux botnets and other malicious software agents. Certain embodiments of the present invention detect such malicious software agents by inspecting and correlating a particular type of network traffic, namely, DNS queries and responses.

In one embodiment, the invention provides a computer-implemented method for detecting malicious software agents. The method includes: (a) constructing a graph based on a plurality of failed queries for domain names sent to one or more domain-name servers by a plurality of hosts during a time period; (b) deriving, from the graph, one or more candidate clusters of hosts; (c) determining, for each candidate cluster and for each of a plurality of time intervals during the time period, a number of new domain names appearing in the failed queries of the candidate cluster during the time interval; (d) determining, for each candidate cluster, a freshness metric based on the numbers of new domain names for the plurality of time intervals in the time period; and (e) detecting one or more malicious software agents on the hosts based on the one or more freshness metrics.

In another embodiment, the invention provides a computer-implemented method for detecting malicious software agents. The method includes: (a) constructing a graph based on a plurality of failed queries for domain names sent to one or more domain-name servers by a plurality of hosts during a time period; (b) deriving, from the graph, one or more candidate clusters of hosts, wherein step (b) includes: (b1) generating multi-level hierarchical groupings of Internet Protocol (IP) addresses in the graph based on similarities between at least first and second levels of domain names in failed domain-name queries made by hosts corresponding to the IP addresses; (b2) determining, for each hierarchical grouping, a highest percentage of failed domain-name queries for which a most recently added IP address in the hierarchical grouping has at least first and second levels of domain names in common with another IP address in the hierarchical grouping; and (b3) identifying each highest-level hierarchical grouping having its determined percentage more than a specified percentage threshold as a candidate cluster of hosts; and (c) determining that one or more of the candidate clusters correspond to malicious software agents.

In yet another embodiment, the invention provides a computer-implemented method for detecting malicious software agents. The method includes: (a) constructing a graph based on a plurality of failed queries for domain names sent to one or more domain-name servers by a plurality of hosts during a time period; (b) deriving, from the graph, one or more candidate clusters of hosts for each of a plurality of time intervals in the time period; (c) linking candidate clusters in adjacent time intervals based on shared IP addresses to form one or more cluster chains; (d) identifying one or more cluster chains that are longer than a specified length threshold; and (e) determining that one or more of the identified cluster chains correspond to malicious software agents.

In a further embodiment, the invention provides an apparatus for detecting malicious software agents, including a query pre-processor, a malicious software agent detector, and a malicious software agent server tracker. The query pre-processor is adapted to construct a graph based on a plurality of failed queries for domain names sent to one or more domain-name servers by a plurality of hosts during a time period. The malicious software agent detector is adapted to: (i) derive, from the graph, one or more candidate clusters of hosts; (ii) determine, for each candidate cluster and for each of a plurality of time intervals during the time period, a number of new domain names appearing in the failed queries of the candidate cluster during the time interval; and (iii) determine, for each candidate cluster, a freshness metric based on the numbers of new domain names for the plurality of time intervals in the time period. The malicious software agent server tracker is adapted to detect one or more malicious software agents on the hosts based on the one or more freshness metrics.

In still a further embodiment, the invention provides an apparatus for detecting malicious software agents, including a query pre-processor, a malicious software agent detector, and a malicious software agent server tracker. The query pre-processor is adapted to construct a graph based on a plurality of failed queries for domain names sent to one or more domain-name servers by a plurality of hosts during a time period. The malicious software agent detector is adapted to derive, from the graph, one or more candidate clusters of hosts, wherein the deriving includes: (i) generating multi-level hierarchical groupings of Internet Protocol (IP) addresses in the graph based on similarities between at least first and second levels of domain names in failed domain-name queries made by hosts corresponding to the IP addresses; (ii) determining, for each hierarchical grouping, a highest percentage of failed domain-name queries for which a most recently added IP address in the hierarchical grouping has at least first and second levels of domain names in common with another IP address in the hierarchical grouping; and (iii) identifying each highest-level hierarchical grouping having its determined percentage more than a specified percentage threshold as a candidate cluster of hosts. The malicious software agent server tracker is adapted to determine that one or more of the candidate clusters correspond to malicious software agents.

In yet a further embodiment, the invention provides an apparatus for detecting malicious software agents, including a query pre-processor, a malicious software agent detector, and a malicious software agent server tracker. The query pre-processor is adapted to construct a graph based on a plurality of failed queries for domain names sent to one or more domain-name servers by a plurality of hosts during a time period. The malicious software agent detector is adapted to: (i) derive, from the graph, one or more candidate clusters of hosts for each of a plurality of time intervals in the time period; (ii) link candidate clusters in adjacent time intervals based on shared IP addresses to form one or more cluster chains; and (iv) identify one or more cluster chains that are longer than a specified length threshold. The malicious software agent server tracker is adapted to determine that one or more of the identified cluster chains correspond to malicious software agents.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 is a block diagram illustrating an exemplary domain-flux botnet;

FIGS. 3(a) and 3(b) are graphs showing the DNS traffic generated by a single Conficker-A bot having a static IP address during a one-day period;

DETAILED DESCRIPTION

Figure 2A:
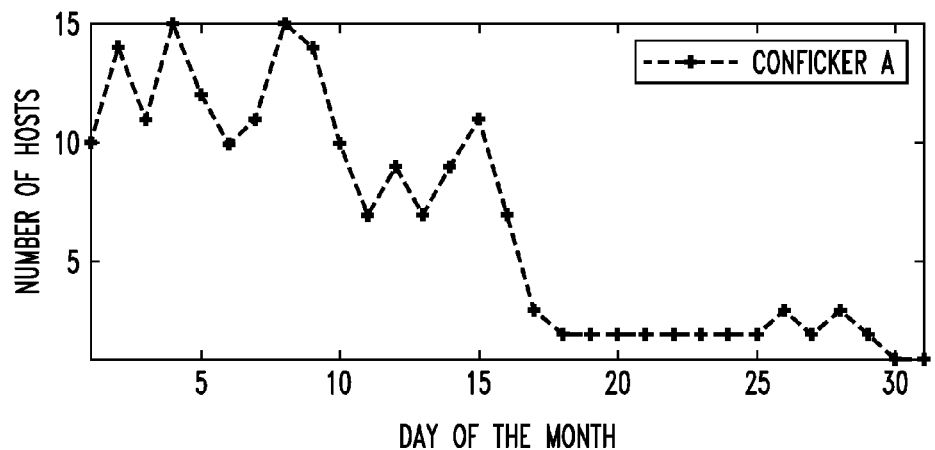
FIG. 2(a) is a graph showing the number of Conficker-A domain-flux bots detected daily during a one-month period.

The inventors hereof studied DNS traffic from a large university network over a three-month period. Based on their observations, the inventors used several domain-generation algorithms (DGAs) obtained through reverse engineering to detect a number of domain-flux bots from the DNS traffic. By studying the behaviors of these bots, it was observed that these bots are characterized by a large number of failed DNS queries. Further, it was observed that bots from the same domain-flux botnet tend to access similar domain names and hence share a number of common failed DNS queries.

Accordingly, certain embodiments of the invention employ a DNS traffic-failure graph that describes how bots (also referred to herein as "hosts") in the network query for different domain names within a specific time window. This graph describes the relationship between hosts and the domain names they have queried but failed. By observing community structures in the graph, domain-flux bots and their associated domain names are identified.

Certain embodiments of the invention employ an agglomerative hierarchical clustering (AHC)-based co-clustering algorithm to extract significant community structures or clusters from the DNS traffic-failure graph corresponding to a certain time window. These extracted clusters are considered "candidate" domain-flux bots, because some of the extracted clusters could indicate anomalies other than domain-flux bots, such as email "spamming" and peer-to-peer file sharing.

Certain embodiments of the invention employ a linking algorithm to connect clusters identified at different time windows and detect persistent clusters. Domain-name changes in these persistent clusters are examined, and the clusters with significant domain-name changes are selected as final detection results for domain-flux botnets.

The data set from the three-month traffic study mentioned above will now be used to illustrate the behavior of DNS traffic generated by domain-flux botnets. The network studied contains approximately 20,000 hosts, with IP addresses that are either static (e.g., IP addresses of computers in laboratories or servers) or dynamic (e.g., IP addresses of machines connected to dormitory networks or to wireless networks). All traffic to and from DNS servers was captured in the form of packet traces collected using the Tcpdump packet analyzer authored by Van Jacobson et al. of the Lawrence Berkeley National Laboratory, University of California, Berkeley, Calif., USA. The captured traffic included (i) DNS requests from all hosts inside the network towards the DNS server and (ii) the corresponding responses from the DNS server back to those hosts. Data extracted from the DNS requests included information about the (anonymized) hosts who initiate the query and the target domain names. Data extracted from the DNS responses included the resolved IP addresses and an associated error code (if any). Approximately 2.29 million DNS queries were captured daily, and those DNS queries were successful 84.5% of the time.

The DGA algorithms for the Conficker-A/B and Torpig botnets, which were obtained from other sources that have already reverse-engineered those algorithms, were used to generate lists of domain names corresponding to each day in the dataset, and these domain names were used to match the DNS-query records to identify infected hosts in the network. The following Table I provides examples of the domain names generated by the DGA algorithms for the Conficker-A and B and Torpig botnets:

TABLE I

| Conficker-A | Conficker-B | Torpig |
|---|---|---|
| nfhfiuqfmgx.biz | ibbbhajo.cc | lvffibef.net |
| qwaeomdj.org | awqnuclyqno.biz | lvffibef.com |
| wyirnxvi.info | jrubwwsnah.info | lvffibef.biz |
| drenhycbfh.net | sbojohtop.cn | kveecbef.biz |
| yrcheuxm.com | haxryh.org | avjttbef.biz |

The DGA algorithms for Conficker-A and B both randomly generate 250 random alphabetical strings having variable lengths, using the current date as a seed for the random-number generation. The DGA algorithm for Conficker-A then selects one top-level domain name from among .com, .net, .biz, .info, and .org to form the final domain names. In comparison, the DGA algorithm for Conficker-B creates domain names by appending to the random strings one top-level domain from one of the above-mentioned five top-level domains used by Conficker-A or from one of the additional top-level domains .ws, .cn, and .cc. Hence, both Conficker-A and B generate a total of 250 domain names every time one of the DGA algorithms is executed. Given sufficient active time, the Conficker-A and B bots will query all 250 of the newly-generated domain names every day in order to connect to their corresponding C&C servers.

Differently from the DGA algorithms for Conficker-A and B, the DGA algorithm for the Torpig bots will first compute three weekly domain names, each consisting of one random string seeded with the current week concatenated with all three top-level domain names .com, .net, and .biz. If DNS queries for all three weekly domain names fail, then the Torpig bot will generate three daily domain names from one random string seeded with the current date concatenated with the three top-level domain names.

Figure 2B:
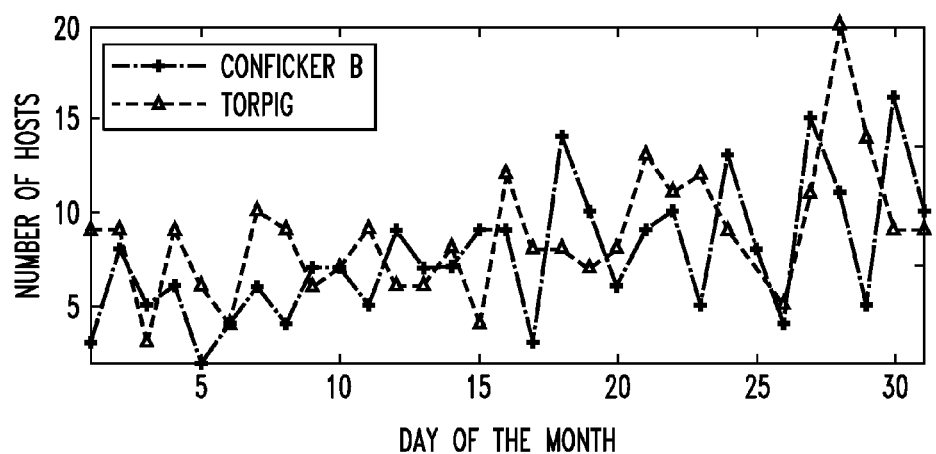
FIG. 2(b) is a graph showing the number of Conficker-B and Torpig domain-flux bots detected daily during a one-month period.

FIG. 2(a) shows the number of Conficker-A domain-flux bots detected daily during the first month of the three-month study discussed above, and FIG. 2(b) shows the number of Conficker-B and Torpig domain-flux bots detected daily during the third month of the same three-month study. In these data sets, instances of bots are counted based on their IP addresses. As shown, the active time periods for different domain-flux botnets vary in the data set, which could possibly be due to new infections, release of system patches, and other user-specific activities. The Conficker-A botnet is more active in the network during the first month, and the Conficker-B and Torpig botnets are observed more frequently during the third month. During these two months, approximately 10 infected hosts are observed during each day, and the number drops to zero after the first month for the Conficker-A bots.

FIGS. 3(a) and 3(b) show the DNS traffic generated by a single Conficker-A bot having a static IP address, during the tenth day of the three-month study discussed above. FIG. 3(a) shows the numbers of successful and failed DNS queries, with each bar indicating the number of successful queries stacked with the number of failed queries, and FIG. 3(b) shows the numbers of normal DNS queries and Conficker-A DNS queries, with each bar showing the number of normal DNS queries stacked with the number of queries targeting Conficker-A domain names. These two plots appear nearly identical, with the exception of a few failures corresponding to normal DNS queries. Most of the bursts of DNS failures are caused by queries for Conficker-A domain names, because only a small number of the Conficker-A domain names are actually registered by the bot master. Not knowing which domain name is valid, the bot proceeds with DNS queries of domain names in the list generated by its DGA algorithm and hence results in the generation of a large number of DNS-query failures. Additionally, such a large number of DNS-query failures often leads to a relatively high failure ratio, i.e., the proportion of DNS queries that fail. Such a large number of query failures is an intrinsic property of domain-flux bots. In order to avoid detection and being blocked, the DGA algorithm tends to generate a domain-name list large enough so that the approach of registering all domain names in the list in order to take over and stop the botnet becomes infeasible.

Although the number of failed DNS queries and the failure ratio might appear to be good metrics for characterizing domain-flux bots, these metrics are not sufficient for differentiating these bots from normal, non-infected hosts.

Figure 4:
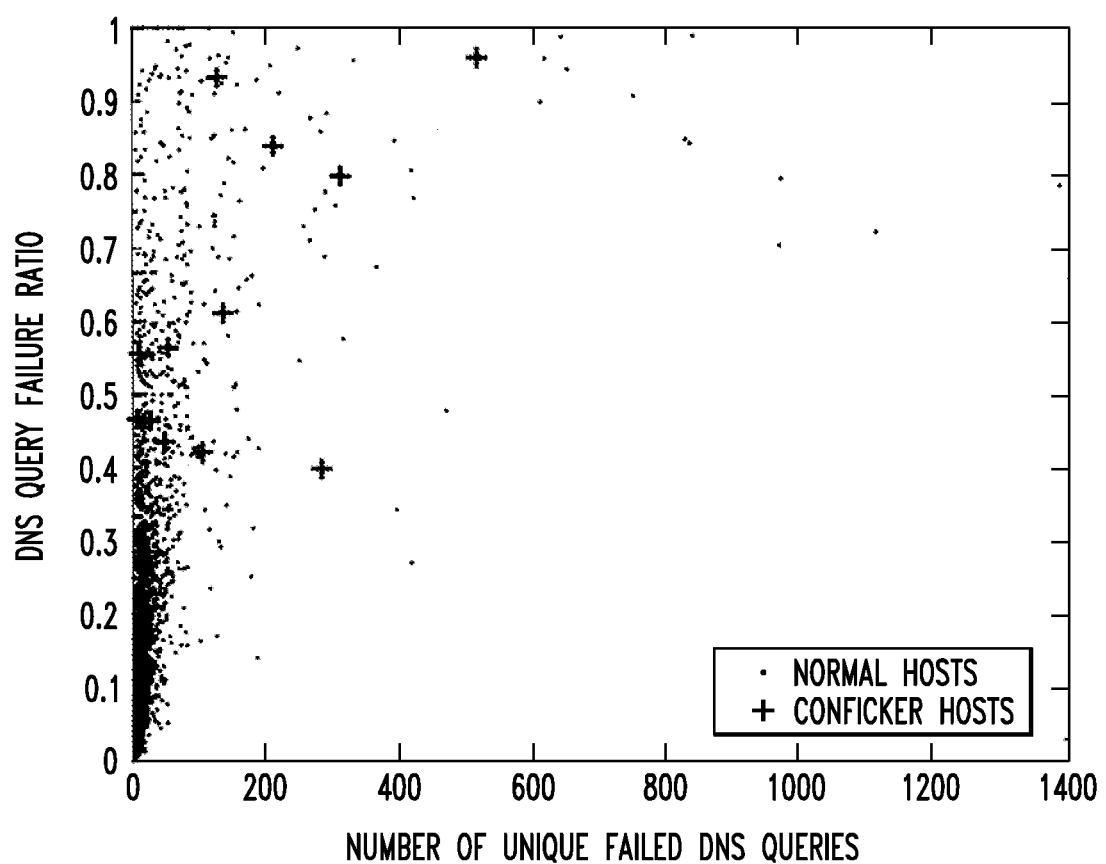
FIG. 4 is a graph showing the number of DNS queries and the query failure ratio for each host, during a one-day period.

FIG. 4 illustrates the number of unique failed DNS queries for both normal and Conficker-A-infected hosts along with the query failure ratio for each host, during the tenth day of the three-month study discussed above. As shown, the Conficker-A bots indeed generate a large number of failed DNS queries, and the corresponding query-failure ratios are relatively high. However, a number of normal hosts also have this property, due to at least three other causes.

The first cause is security-related queries, where a normal host uses DNS queries to check online black lists to identify spam email messages. For example, a host might send the DNS query 4idiotsweightthree.com.bl.open-whois.org to validate whether the email sender 4idiotsweightthree.com is listed as a known spamming site. Since the senders in most spam emails do not actually exist, this process generates a lot of query failures.

The second cause is spamming activities in which a host might be involved, where the host queries for a list of email servers, resulting in a large number of query failures.

The third cause is random queries. It has been observed that a number of hosts query for random strings, such as "11j4bqovk.elq33de8", and no explanation has yet been found for such queries. (Another cause of failed DNS queries is users mistyping or misspelling domain names. However, this type of query failures accounts for only a very small percentage of failed DNS queries and has little influence on the detection results of certain embodiments of the invention.)

Accordingly, although DNS-query failures are an intrinsic property of domain-flux botnets, using that information alone can cause a lot of false-positive alarms, due to other possible causes of DNS-query failures. This problem can be solved through the use of DNS-query failure correlation using DNS-traffic graphs from domain-flux bots, as will now be explained.

The term "graph," as used herein in the context of characterizing network traffic, means a symbolic representation of a network and its connectivity as a set of objects (called nodes or vertices) connected by lines (called links or edges). Although a graph can be depicted visually as a set of dots (the vertices) connected by lines (the edges), the term "graph" also refers to the underlying data structure in which a representation of the set of nodes and links between the nodes is stored.

A DNS-traffic graph is a bi-partite graph describing how hosts in the network query for different domain names within a specific time window T (usually one day). More specifically, in an exemplary traffic graph consistent with certain embodiments of the invention, the variable $\mathcal{H}$ denotes the set of hosts h for monitoring, and the variable $\mathcal{D}$ denotes the set of domain names d associated with the queries from the set $\mathcal{H}$ of hosts. The variable $\mathcal{G}$ represents the DNS traffic graph, defined as $\mathcal{G} := \{\mathcal{V}, \mathcal{E}\}$. The variable $\mathcal{V}$ represents the set of vertices (i.e., nodes), defined as $\mathcal{V} := \mathcal{H} \cup \mathcal{D}$, and the variable $\mathcal{E}$ represents the set of edges (i.e., links) e, where the expression $e_{ij}$ refers to an edge between vertices i and j. The most common visual representation of a graph is by means of a diagram in which each vertex is represented as a point, and each edge is represented as a line segment joining its end vertices. This diagram itself is also referred to as a graph.

An edge is a member of the set $\mathcal{E}$ if a DNS query (e.g., a DNS-A type query in accordance with the IPv4 protocol) is observed from a host h, for resolving a domain name $d_j$, and the query response satisfies a condition $\mathcal{P}$. A DNS-failure graph $\mathcal{G}_F$ includes the set of all queries that fail, while a DNS-success graph $\mathcal{G}_S$ includes the set of all successful queries.

Although the DNS-traffic graphs discussed herein are considered to be non-weighted, i.e., as indicating only the absence or presence of a certain DNS query, methods consistent with the invention can be extended to weighted DNS-traffic graphs as well. For example, the weight of an edge might represent the number of repeated queries associated with that edge.

By inspecting DNS-traffic graphs, it can be seen that, since all the domain-flux bots belonging to the same botnet share the same domain-name list and query for a number of the same domain names on the list until success, these bots share a lot of common failed DNS queries targeting the same non-existent domains. These bots are also likely to share the same successful DNS queries containing the IP address of the C&C server. Accordingly, community structures, i.e., richly-connected subgraphs, within DNS-traffic graphs reflect DNS-traffic correlations that are likely related to domain-flux botnets.

Figure 5A:
FIG. 5 is a graph showing a DNS-failure graph created from DNS queries collected during a one-day period.
Figure 5B:
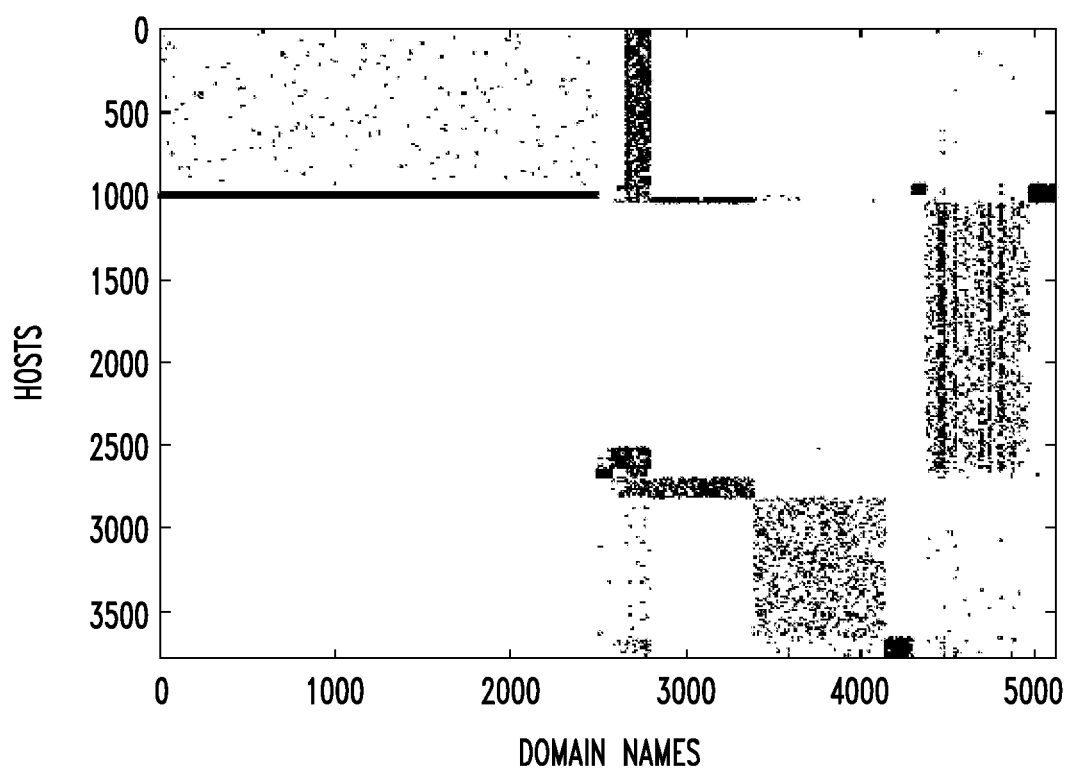

Such traffic correlations can be seen in FIGS. 5(a) and 5(b), which are visual depictions of a DNS-failure graph $\mathcal{G}_F$ created from DNS queries collected during the tenth day of the three-month study discussed above, generated using the Graphviz open-source graph visualization software available at http://www.graphviz.org. In FIG. 5(b), each index number on the x-axis represents a unique domain name, and each index number on the y-axis represents a unique IP address corresponding to a host.

In FIG. 5(a), each dot represents either a host or a domain name, and each line between dots represents a failed query. It can be seen that most of the nodes in the graph are connected either directly or indirectly to a large number of other nodes, and a few strongly-connected subgraphs can be observed, appearing as larger darkened areas on the graph. These subgraphs indicate a large number of hosts that query the same domain names and receive DNS-resolution failures. In fact, 45.8% of the nodes in the graph are connected to one another, resulting in a giant connected subgraph.

In FIG. 5(b), the same DNS-traffic graph as that shown in FIG. 5(a) is shown in a different visual form, namely, an adjacency matrix, to enhance visualization of the community structures in the graph. An adjacency matrix is a representation of which vertices of a graph are adjacent to which other vertices. Specifically, the adjacency matrix of a finite graph $\mathcal{G}$ on n vertices is the n×n matrix where the nondiagonal entry $a_{ij}$ is the number of edges from vertex i to vertex j, and the diagonal entry $a_{ii}$ is either once (typically for undirected graphs) or twice (typically for directed graphs) the number of edges (loops) from vertex i to itself. For each graph, a unique adjacency matrix exists that is not the adjacency matrix of any other graph. For a DNS-traffic graph $\mathcal{G}$, there is a corresponding adjacency matrix $A=[a_{ij}]$, where the rows and columns of the matrix represent hosts $\mathcal{H}$ and domain names $\mathcal{D}$, respectively. An entry $a_{ij}$ in the matrix is equal to 1 if an edge (i.e., a query) exists between a host $h_i$ and a domain name $d_j$, and is equal to 0 otherwise. The rows and columns in the adjacency matrix are rotated to reflect the community structures in the graph as clearly as possible. In FIG. 5(b), the adjacency matrix shows a number of block structures representing densely-connected subgraphs or communities between groups of hosts and groups of domain names. Investigation of these communities reveals that these communities are associated with suspicious correlated DNS activities, and in particular, domain-flux botnets, such as Conficker-A/B, Torpig, as well as other activities, such as spamming, Trojan horses, and the like.

To extract the community structures from the DNS traffic graph, and hence to detect domain-flux botnets, one solution is to apply classical co-clustering algorithms to identify dense co-clusters in the adjacency matrix. However, two problems still remain to be solved. First, false positives (false alarms) for an anomaly-detection problem can sometimes be more costly than false negatives (missed detections), and it is therefore desirable to use a co-clustering algorithm that identifies co-clusters with a high density, i.e., hosts within the same co-cluster that indeed share a lot of common DNS queries. Second, the domain-name list for a domain-flux botnet will change over time. Therefore, a linking algorithm desirably correlates community structures identified at different time windows in order to detect true domain-flux botnets.

Figure 6:
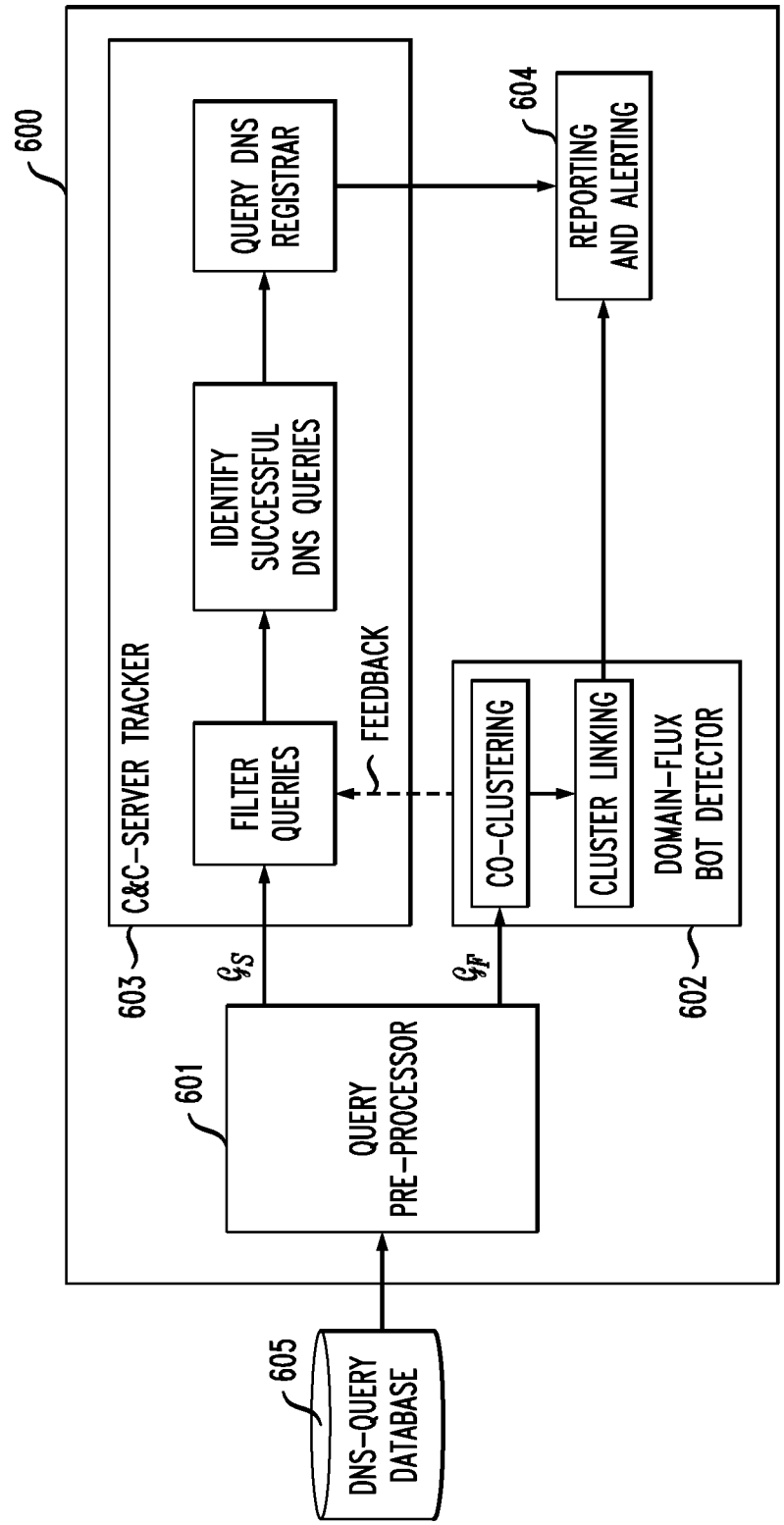
FIG. 6 is a block diagram of an exemplary system for identifying domain-flux bots and locating command-and-control (C&C) servers, consistent with one embodiment of the invention.

FIG. 6 is a block diagram of an exemplary system 600 for identifying domain-flux bots and locating C&C servers, consistent with one embodiment of the invention. System 600 includes a query preprocessor 601, a domain-flux bot detector 602, a C&C-server tracker 603, and a reporting and alerting module 604.

System 600 receives, as input, DNS-query data that has been collected and stored in a DNS-query database 605 (or, alternatively, such data could be provided by DNS-query logs or some other means). The DNS-query data enters query preprocessor 601, which (after performing certain other steps, such as conversion and filtering) converts the DNS queries into DNS-traffic graphs. Query preprocessor 601 provides, (i) to domain-flux bot detector 602, a DNS-failure graph $\mathcal{G}_F$ generated at different time intervals and, (ii) to C&C-server tracker 603, a DNS-success graph $\mathcal{G}_S$ specific to domain-flux bots that have been discovered.

Domain-flux bot detector 602 identifies domain-flux bots based on DNS-failure graph $\mathcal{G}_F$, using a co-clustering algorithm and a cluster-linking algorithm, as will be described in further detail below.

C&C-server tracker 603 identifies the common successful domain-name queries from DNS-success graph $\mathcal{G}_S$, which successful queries are specific to the domain-flux bots of which C&C-server tracker 603 is aware and are likely to be related to the C&C server. C&C-server tracker 603 can then provide the list of successful domain names used for the C&C server to reporting and alerting module 604, which generates reports and/or initiates alerts, e.g., in the form of electronic messages. Such alerts and/or reports, which include information identifying one or more C&C servers (e.g., by IP addresses and/or domain names) and/or bots, can be sent, e.g., to a network operator, or to a DNS registrar to determine who registered these domain names.

Query preprocessor 601 converts DNS-query data of various formats into DNS-traffic graphs, e.g., DNS-failure graph $\mathcal{G}_F$ and DNS-success graph $\mathcal{G}_S$, within a specific time interval T. In one embodiment, query preprocessor 601 also conducts a "sanity check" on the target domain names and performs conversion and filtering on domain names and hosts using the following exemplary method.

First, query preprocessor 601 filters out security-related queries. Most online DNS blacklists commonly used to block email spam, also known as domain-name server blacklists (DNSBL) or realtime blacklists (RBL), and anti-virus databases use DNS queries as a method for validating whether an email sender or a particular website is malicious. Since most senders of spam emails do not use actual valid and existing email addresses, such queries could result in a large number of failures that might falsely appear to be caused by a domain-flux botnet. To solve this problem, query preprocessor 601 uses a manually-created list of popular RBLs and anti-virus databases appearing in the dataset to filter out such queries, eliminating them from the data set.

Second, query preprocessor 601 converts all domain names into second-level domain names by truncating any third and higher levels of the domain names. Due to the wide applications of server-relay and content-distribution networks (i.e., systems of computers containing copies of data placed at various points in a network), a number of failed domain-name queries are caused by a few out-of-service machines within the same domain. To address this problem, instead of considering the original domain names, query preprocessor 601 uses only the top and second levels of domain names to construct the DNS-traffic graphs (e.g., host.computer.domain.com and machine.domain.com are both truncated into domain.com), with the following exception. If the top level of the domain name appears to be a two-letter country name (e.g., .jp, .tw, .us, .uk, or .il), then query preprocessor 601 uses only the top, second, and third levels of domain names to construct the DNS-traffic graphs (e.g., machine.domain.co.uk and host.computer.domain.co.uk are both truncated into domain.co.uk). The foregoing step of conversion by truncation eliminates false detection caused, e.g., by a few out-of-service machines within the same domain, while still retaining data corresponding to botnets, Trojans, and the like, most of which use second-level domain names for their C&C servers.

Third, query preprocessor 601 filters out inactive hosts. In order to identify DNS correlations that are statistically significant, all hosts having fewer than N associated DNS failures in a day are removed from the data set. (A typical value of N is 5, as will be discussed below with reference to FIG. 7(c), although other values are possible). In certain embodiments of the invention, detection of botnets takes place over a relatively long period, such as that of the three-month study discussed above. Accordingly, filtering out inactive hosts from the data set will not affect hosts that happen to be inactive for, e.g., only a few days.

Domain-flux bot detector 602 receives DNS-failure graph $\mathcal{G}_F$ from DNS-query preprocessor 601. In one embodiment, domain-flux bot detector 602 first applies a co-clustering algorithm on DNS-failure graph $\mathcal{G}_F$ to identify IP addresses having highly correlated DNS queries as candidates for possibly being domain-flux bots, and domain-flux bot detector 602 then uses a linking algorithm to correlate the co-clustering results generated at different time periods to differentiate actual domain-flux bots from other DNS anomalies. Then, domain-flux bot detector 602 sends a list of IP addresses to C&C-server tracker 603 regarding the hosts involved in the domain-flux activity or other suspicious DNS activities. In this list, related IP addresses are grouped together, to assist in distinguishing domain-flux bots from other DNS anomalies.

C&C-server tracker 603 locates the potential C&C server based on the list of suspicious addresses received from domain-flux bot detector 602 in conjunction with DNS-success graph $\mathcal{G}_S$ received from DNS-query preprocessor 601. More specifically, C&C-server tracker 603 first filters out all of the successful domain-name queries from the hosts that are not in the suspicious address list. C&C-server tracker 603 then identifies the remaining successful domain-name queries shared by each suspicious address group and reports those domain names and their corresponding IP addresses used in the queries as being the location of one or more C&C servers.

Certain embodiments of the present invention employ co-clustering and linking algorithms to detect domain-flux bots, as follows. First, IP address and domain-name co-clustering is performed on the daily DNS-failure graphs to discover richly-connected host communities and their associated domain names, which host communities are candidates for possibly being domain-flux bots. Next, these host communities, which are discovered by daily co-clustering over time, are linked, and a list of persistent clusters, i.e., clusters lasting longer than a specified number of days, is created. For each persistent cluster, changes in its domain names are then examined. If a high proportion of new domain names is observed, then that cluster is identified as being a domain-flux bot. Before describing these algorithms in further detail, certain characteristics of the DNS-failure graph will first be discussed with reference to the data set from the tenth day of the three-month study discussed above.

The data from this 24-hour period is pre-processed and filtered by query preprocessor 601 as discussed above, i.e., to filter out security-related queries, to convert domain names into second-level domain names, and to filter out inactive hosts. Prior to this pre-processing, the data set contains approximately 3,800 IP addresses, with approximately 13,000 unique domain-name failures. After pre-processing, the data set contains only 56 hosts, with approximately 5,500 unique domain-name failures, since the majority of the IP addresses have very few failures.

Figure 7A:
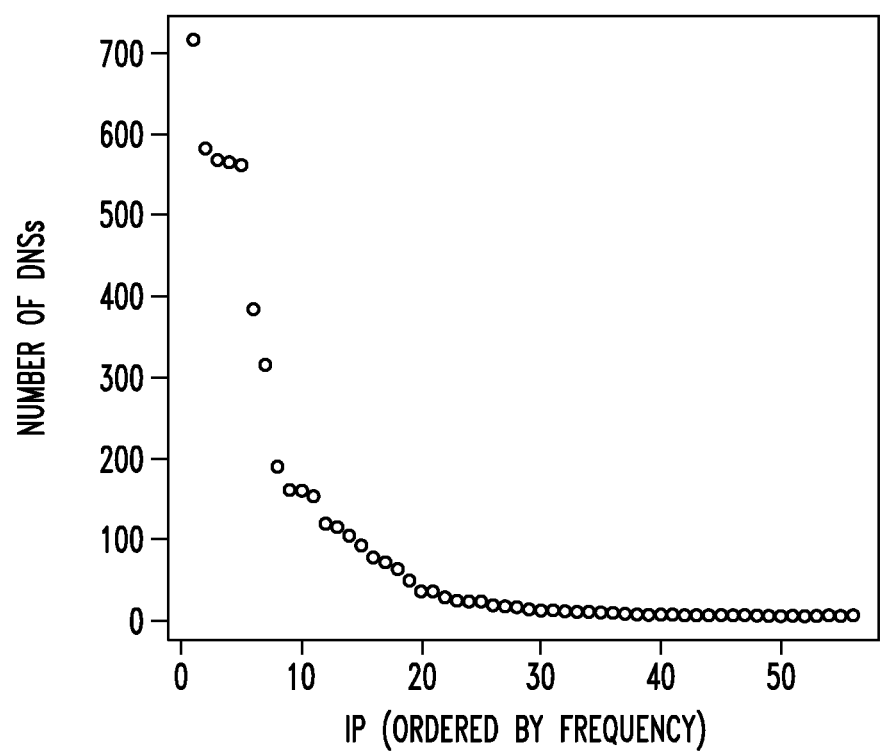
FIG. 7(a) is a graph showing the number of unique domain-name failures per IP address, after pre-processing and filtering by the query preprocessor of FIG. 6, during a one-day period, in one embodiment of the invention.
Figure 7B:
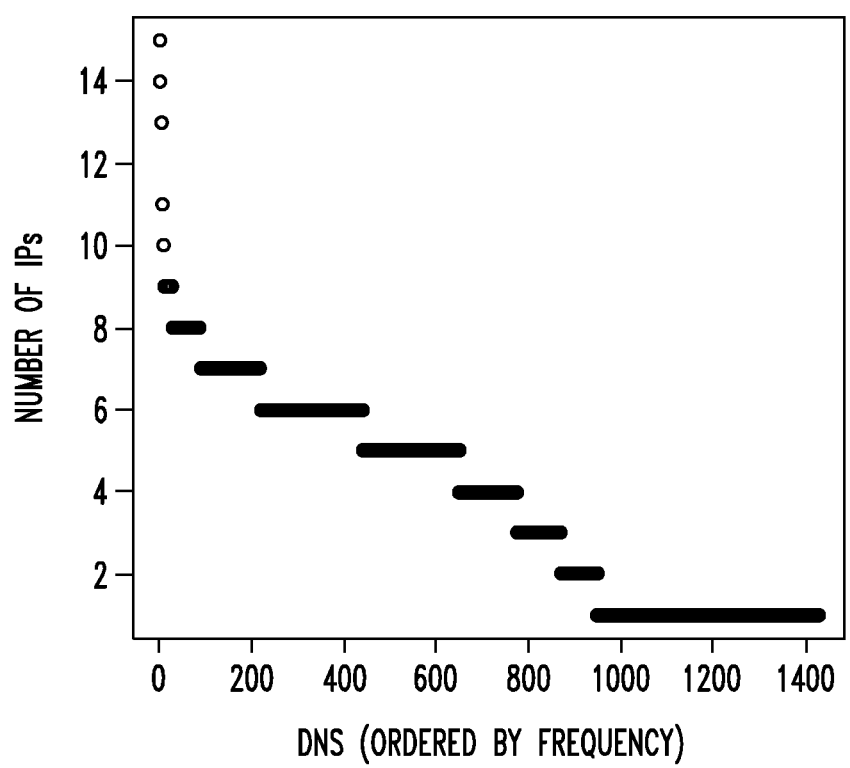
FIG. 7(b) is a graph showing the number of unique IP addresses per failed domain name, after pre-processing and filtering by the query preprocessor of FIG. 6 during a one-day period, in one embodiment of the invention.
Figure 7C:
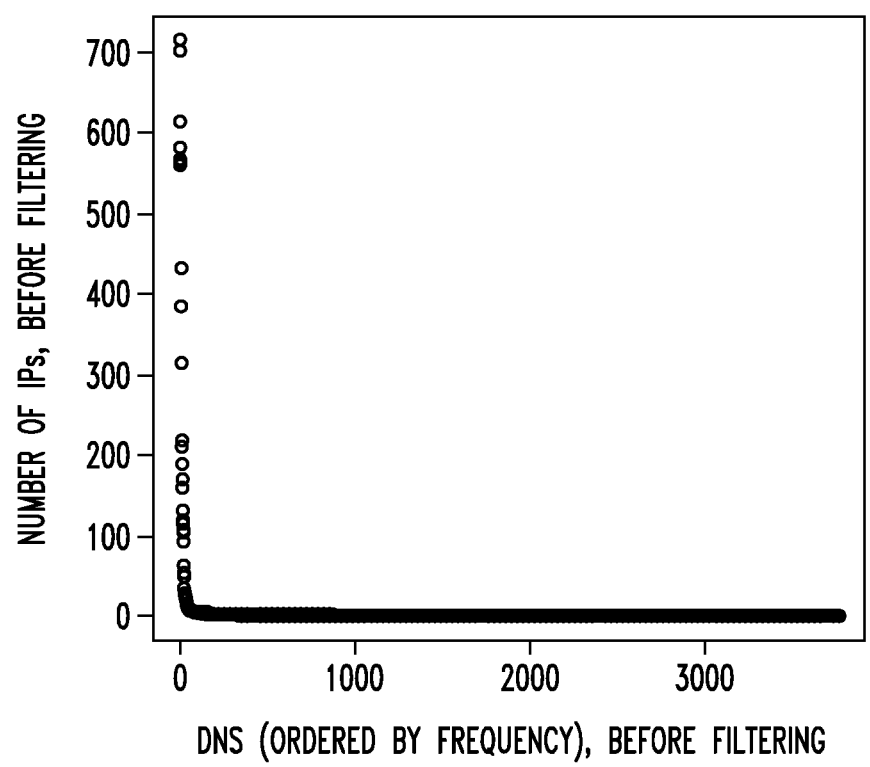
FIG. 7(c) is a graph showing the number of unique IP addresses per failed domain name, after pre-processing by the query preprocessor of FIG. 6 during a one-day period, but before IP filtering, in one embodiment of the invention.

FIG. 7(*a*) shows the number of unique domain-name failures per IP address, ordered from largest to smallest, on the tenth day of the three-month study discussed above, after pre-processing and filtering by query preprocessor 601, and FIG. 7(*b*) shows the number of unique IP addresses per failed domain name, ordered from largest to smallest, on the tenth day of the three-month study discussed above, after pre-processing and filtering by query preprocessor 601.

From FIG. 7(*a*), it can be seen there is a large variation in terms of the number of failures per IP address. While there are some IP addresses that are considered "heavy hitters," i.e., that generate a large number of failures, the majority of IP addresses produce only a small number of failures. In FIG. 7(*b*), however, the domain names are more evenly spread out, and there are no obvious heavy hitters.

FIG. 7(*c*) shows the number of unique IP addresses per failed domain name, ordered from largest to smallest, on the tenth day of the three-month study discussed above, but including the entire unfiltered set of IP addresses, i.e., prior to pre-processing and filtering by query preprocessor 601. Given the presence of heavy-hitter domain names in FIG. 7(*c*), it can be see that the absence of heavy hitters in FIG. 7(*b*) is mostly attributed to query preprocessor 601 filtering out all hosts that have fewer than 5 failed domain names.

This large variation in frequency of IP-address failure impacts the design of a co-clustering algorithm consistent with the present invention. In fact, empirical data shows that such a difference persists even among the same type of domain-flux bots. For example, on the tenth day of the three-month study, there are 10 observed Conficker-A hosts, which have 161, 153, 119, 104, 71, 35, 35, 28, 24, and 9 distinct domain-name failures, respectively. It is noted that the Conficker-A DGA algorithm produces 250 new domains for each bot to query every day. The small failure number for some Conficker-A bots might be caused either by premature termination due to user actions (e.g., turning off computers) or by successes found earlier in the process. It is further noted that, although the absence of domain-name heavy hitters after query pre-processing might simplify a co-clustering algorithm consistent with certain embodiments of the invention, it is not necessary that such heavy-hitters be filtered out by query preprocessor 601, because the algorithm can be adapted to accommodate the presence of such heavy hitters, as will be discussed in further detail below.

One exemplary embodiment of a co-clustering algorithm for IP addresses and domain names, as used by domain-flux bot detector 602, is based on an agglomerative hierarchical clustering (AHC) method using single linkage. By way of overview, the algorithm first generates multi-level hierarchical groupings (i.e., clusters) of IP addresses in the graph based on similarities between (e.g., at least first and second levels of) domain names queried by the IP addresses. Next, the algorithm determines, for each hierarchical grouping, the highest percentage of (at least first and second levels of) domain-name query failures that each IP address in the hierarchical grouping has in common with at least one other IP address in the hierarchical grouping. Finally, the algorithm identifies each highest-level hierarchical grouping having its determined percentage more than a specified percentage threshold as a candidate cluster of hosts.

The details of an exemplary single-linkage algorithm for co-clustering will now be described. Given a DNS traffic graph $\mathcal{G}$ and its corresponding adjacency matrix $A=[a_{ij}]$ for a pair of hosts i and j, the expression $A'_i, A'_j$ denotes the i,jth row of adjacency matrix A, which represents the connectivity pattern for hosts i and j. Co-clustering is performed using a similarity metric s(i, j) (which can also be referred to as a "distance metric," where the smallest dissimilarity corresponds to the shortest distance) defined between hosts i and j, using the following Equation (1):

$$s(i,j) = A'_i A_j / \min(|A'_i|, |A'_j|), \quad (1)$$

where $|A'_i|$ and $|A'_j|$ represent the numbers of 1 s in matrices $A_i$ and $A_j$, respectively. This metric can be interpreted as the maximum proportion of shared domain names between hosts i and j. For example, if host i visits 50 domain names, and host j visits 10 domain names, 5 of which are also visited by host i, then the similarity between the two hosts is 50% (i.e., the percentage is relative to the host having a smaller number of total domain-name failures).

It is noted that the similarity metric of Equation (1) differs from more commonly used metrics for binary vectors, such as $A'_i A_j/(|A'_i|+|A'_j|-A'_i A_j)$, which represents the proportion of shared 1 s among all non-zero entries. The reason for selecting the similarity metric of Equation (1) is as follows. For the Conficker botnets, it has been observed that a significant percentage of bots visit only a partial list of the generated domain names. In this scenario, even if both hosts are Conficker bots, the percentage of shared domain names among all domain names might be relatively small, which could lead to a small similarity score if the traditional similarity metric defined for binary vectors were used. As a result, an AHC method using this traditional metric might fragment the Conficker bots into several clusters, depending on their query frequencies (high-frequency bots would all be in one cluster, but low-frequency bots might not belong to the same cluster), which produces the undesirable result of failing to detect the corresponding botnet. However, if the similarity metric of Equation (1) is used, then a high-frequency bot and a low-frequency bot will tend to have a high similarity score, since most of the domain names queried by the low-frequency bot will overlap with the domain names queried by the high-frequency bot.

More specifically, an AHC method consistent with certain embodiments of the invention proceeds as follows. First, each IP address begins as a small cluster by itself, and those single-IP-address clusters need not be sorted in any particular order prior to being merged. Next, clusters are agglomerated (or "merged") using the similarity metric of Equation (1), to find the greatest similarity between (at least first and second levels of) domain names queried by an IP address in the first cluster and (at least first and second levels of) domain names queried by an IP address in the second cluster to which the IP address in the first cluster is the most similar (referred to as the "nearest neighbor" method). Using this method, at each iteration, the two clusters found to have the greatest similarity based on Equation (1) are combined to form one larger cluster (also referred to as a hierarchical grouping). Each agglomeration occurs between clusters having a smaller similarity between domain names than the previous agglomeration, and the agglomeration stops when only one large cluster containing all of the IP addresses, called a "clustering tree," remains. The term "single linkage" refers to the fact that the similarity between two clusters is determined only by the similarity between a single IP address from the first cluster and a single IP address from the second cluster that are the most similar to one another (in this particular context, "similar" IP addresses are IP addresses having a high proportion of failed domain-name queries that share at least first- and second-level domain names in common).

As will be described in further detail below, once the clustering tree has been obtained using, e.g., the foregoing AHC method, the final clusters are found by cutting the tree at a predetermined height, after which each end point is treated as a single cluster.

Using the foregoing single-linkage AHC method, it is very likely that all Conficker hosts will end up in the same cluster, so long as there is some high-frequency bot acting as the glue that connects them. It is further noted that the similarity metric defined in Equation (1) is applicable to situations in which there are no heavy-hitter domain names. In the presence of heavy-hitter domain names, an undesirable consequence of using the metric of Equation (1) might be a giant cluster that contains all IP addresses that query the heavy-hitter domain names. However, this problem can be overcome by associating each domain name with a weight that is inversely proportional to its frequency and defining a new similar metric using weighted sums and proportions, as will now be described.

Based on the three-month study discussed above, it has been determined that weighting each domain name is desirably performed using a threshold value of 0.6 as the cutting threshold for the clustering tree, which implies that, if two IP addresses are in the same cluster, then each of those IP addresses shares 40% of failed domain-name queries with at least some other IP address in the cluster. Other threshold values are possible in alternative embodiments of the invention.

Figure 8:
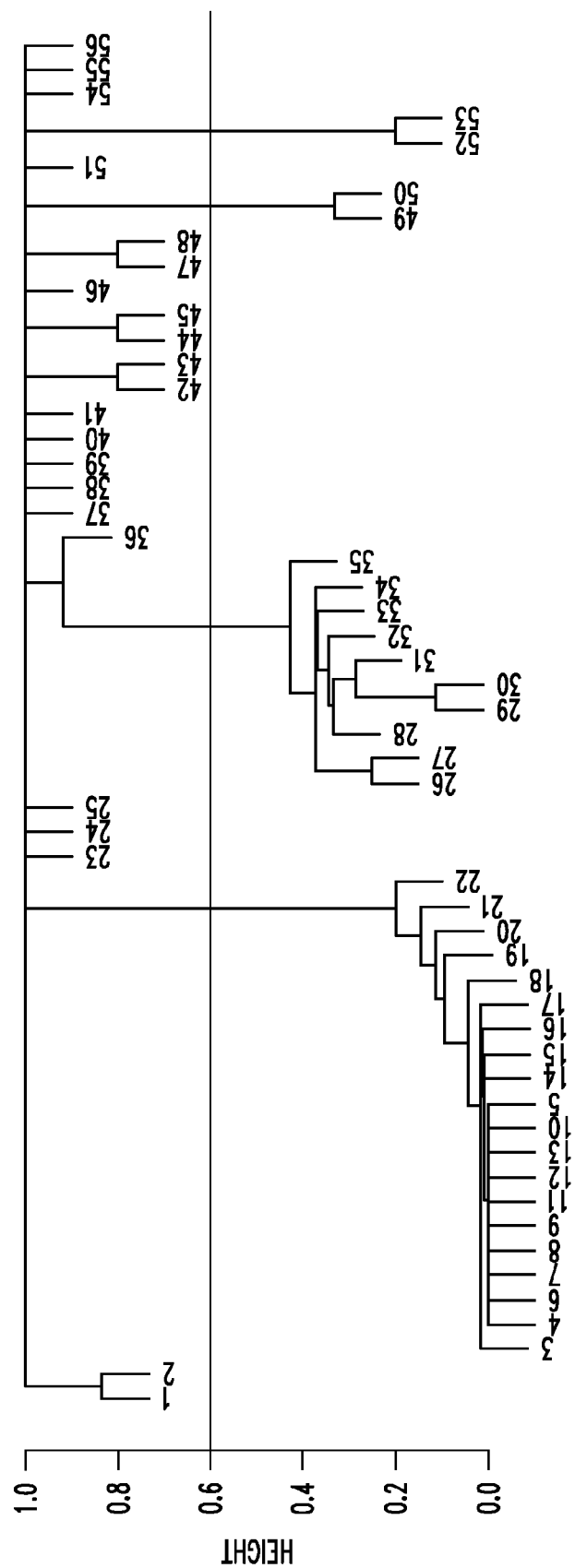
FIG. 8 is a dendrogram illustrating the host clusters identified using an agglomerative hierarchical clustering method consistent with one embodiment of the invention.

FIG. 8 is a dendrogram illustrating the host clusters identified using the foregoing-described AHC method. To improve readability, the IP addresses are represented by index numbers, and the index numbers follow the order of their appearance in the clustering tree. In FIG. 8, each index number (from 1 to 56) represents a different IP address corresponding to a host, and the clusters of IP addresses obtained using an AHC method, as discussed above, are shown as hierarchical groupings of two or more index numbers at different heights. The heights correspond to the similarity between domain names in failed queries made by IP addresses in the same cluster. In particular, the height for a particular cluster corresponds to the highest percentage of failed domain-name queries made by the most recently added IP address that have at least the first and second levels of the domain name in common with the domain names of failed domain-name queries made by another IP address in the cluster.

For example, IP addresses 29 and 30 are agglomerated together because, for about ninety percent (i.e., height equal to about 0.1 in FIG. 8) of the total number of failed domain-name queries made by IP addresses 29 and 30, each failed domain-name query made by IP address 29 had at least the same first and second level of domain-name as at least one failed domain-name query made by IP address 30. In this case, IP addresses 29 and 30 may be said to have about 90 percent of failed domain-name queries in common It is further assumed that IP address 31 has 60 percent of its failed domain-name queries in common with IP address 29, 70 percent of its failed domain-name queries in common with IP address 30, and lower percentages in common with all of the other IP addresses in FIG. 8. In that case, as represented in FIG. 8, IP address 31 is agglomerated with the cluster containing IP addresses 29 and 30 at a height of 0.3, because 70 percent is the highest percentage of failed domain-name queries that IP address 31 has in common with another IP address in that cluster.

In this example, the cluster consisting of IP addresses 29 and 30 is said to have a height of 0.1, while the cluster consisting of IP addresses 29, 30, and 31 is said to have a height of 0.3.

It is noted that clusters where there is at least one IP address that has no failed domain-name queries in common with the failed domain-name queries of at least one other IP address in that cluster have a height of 1, and clusters where each IP address has each of its failed domain-name queries in common with at least one failed domain-name query for each other IP address in that cluster have a height of 0.

A horizontal line shows the cutting threshold, which is at a height of 0.6. This cutting threshold is used to identify clusters having a height below the cutting threshold, and those identified clusters are considered candidates for being domain-flux bots. For example, in FIG. 8, a cutting threshold of 0.6 identifies four candidate clusters: a first candidate cluster consisting of IP addresses 3-22, a second candidate cluster consisting of IP addresses 26-35, a third candidate cluster consisting of IP addresses 49 and 50, and a fourth candidate cluster consisting of IP addresses 52 and 53.

In addition to the identified known domain-flux bots (Torpig, Conficker-A, and

Conficker-B), two Trojan horses (Dropper and Tidserv) were identified by performing a search using the Google search engine for those domain names identified as corresponding to possible malicious software agents. Close inspection of these clusters revealed that (i) the first candidate cluster (IP addresses 3-22) contains all Torpig bots found, (ii) the second candidate cluster (IP addresses 26-35) contains all Conficker-A bots found, and (iii) the third candidate cluster (IP addresses 49 and 50) contains all Dropper Trojan horse instances found. Additionally, IP address 25 was found to contain Conficker-B bots (only one host was actually infected with Conficker-B in this case), and the cluster consisting of IP addresses 42 and 43 was found to contain hosts infected with the Tidsery Trojan horse. Accordingly, it can be seen that a co-clustering algorithm consistent with certain embodiments of the invention provides good results for finding host communities.

Having identified a set of host clusters using the AHC method, the corresponding domain-name clusters are derived as follows. For each domain name, a host cluster i is found that generates the most queries for that domain name, and the cluster number i is assigned to that domain name. Therefore, for each host cluster, there is a corresponding domain-name cluster containing the names that the hosts in the host cluster query the most.

Figure 9A:
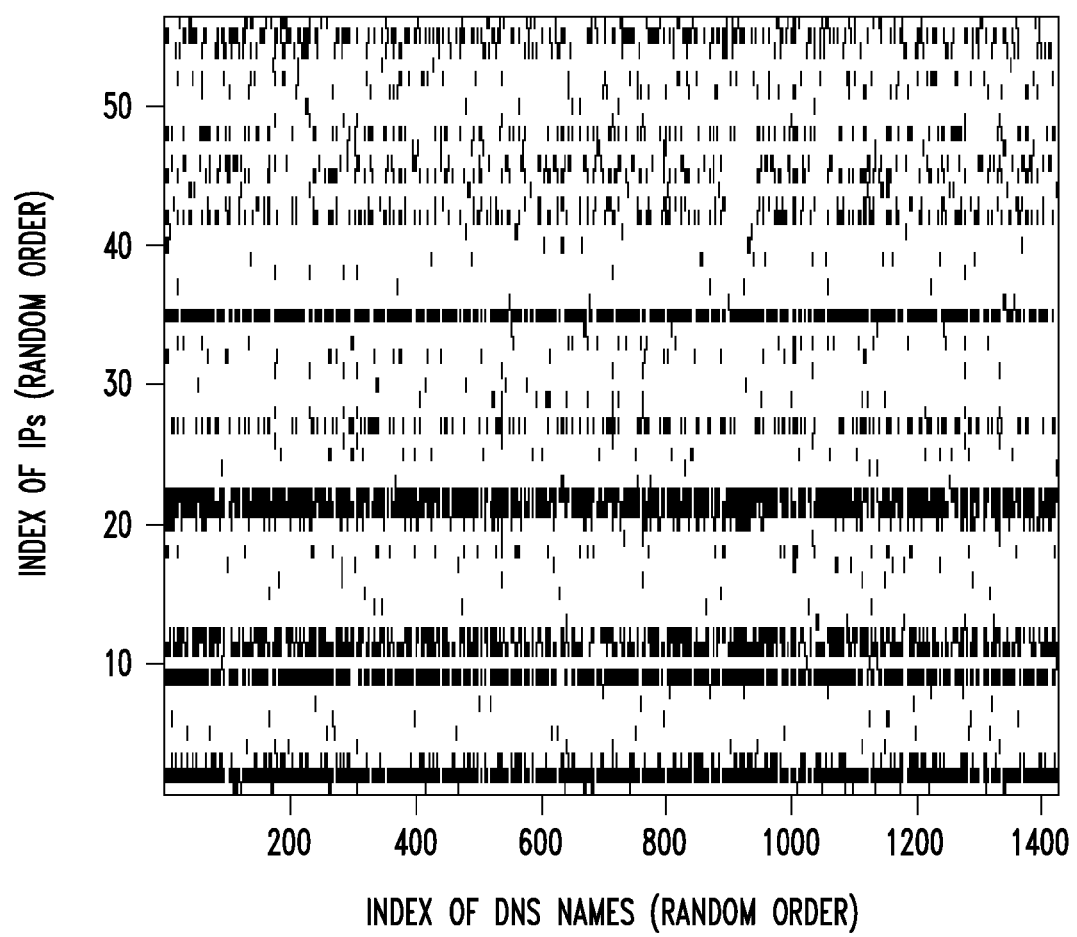
FIGS. 9(a) and (b) are graphs showing the adjacency matrix of the DNS-failure graph as the result of IP-address and domain-name co-clustering, in one embodiment of the invention.
Figure 9B:
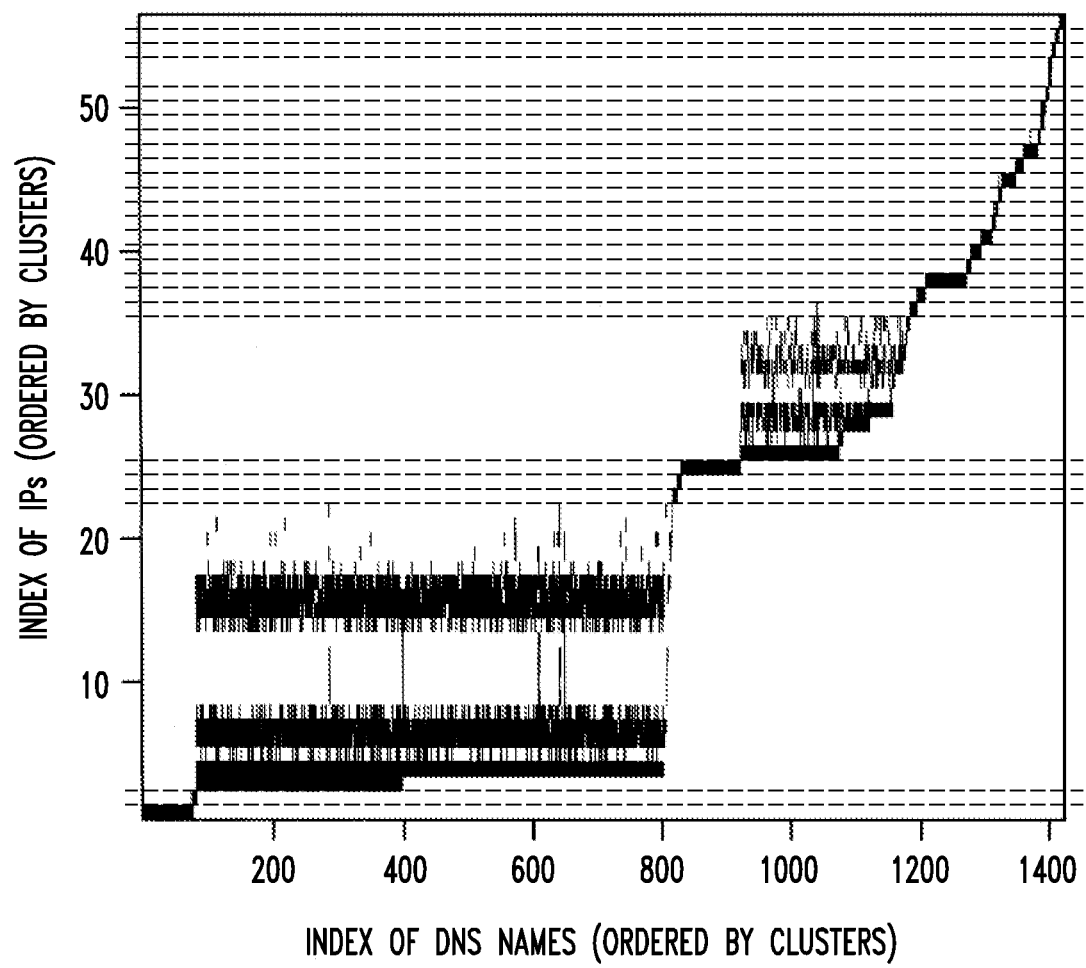

FIGS. 9($a$) and ($b$) are graphs showing the adjacency matrix of the DNS-failure graph as the result of IP-address and domain-name co-clustering. In FIG. 9($a$), the order of IP addresses and domain names is randomly permuted, and each vertical bar indicates a query association between IP addresses and domain names. No clear pattern is perceptible in FIG. 9($a$). However, in FIG. 9($b$), the IP addresses and domain names are ordered by their cluster number, in accordance with FIG. 8, and horizontal dashed lines are used to assist in differentiating between the different clusters. From FIG. 9($b$), it can clearly be seen that the adjacency matrix is now mostly lined up in diagonal blocks, with most of the non-diagonal blocks having a value of 0, indicating a tight one-to-one match between IP-address clusters and domain-name clusters. Two large IP-address and domain-name communities are evident from FIG. 9($b$), one corresponding to the Torpig bots (cluster 3 in FIG. 8), and the other corresponding to the Conficker-A bots (cluster 7 in FIG. 8). Divergent behavior even among hosts in the same cluster can be seen, with some IP addresses generating a large number of failures, while others generate only a few failures. Nevertheless, a co-clustering algorithm consistent with the invention was still able to group those IP addresses together, irrespective of their differences in query frequencies.

A co-clustering method consistent with certain embodiments of the invention has advantages over alternative co-clustering methods, such as those that focus on the dominant patterns. One example of this is the tri-factor non-negative matrix factorization (TNMF) method for co-clustering, which is a factorization-based method that focuses on the decomposition of matrices into blocks, such that the error between the original matrix and the re-generated matrices from the decomposition is minimized In certain embodiments of the present invention, so long as two IP addresses query the same population of domain names, they will be in the same cluster, no matter how many queries they actually generate. However, methods such as the TNMF method have no explicit way to account for this, such that hosts from the same bot can end up in different clusters and therefore are not detected. Certain embodiments of the present invention do not focus on a dominant IP address and instead treat each IP address equally, resulting in an improved co-clustering result. Another advantage of co-clustering methods consistent with certain embodiments of the invention is that the number of clusters does not need to be fixed in advance. In other words, once a cutting threshold has been chosen for a clustering tree, that same threshold can be used throughout the entire detection method (e.g., for data collected over the course of an entire three-month period), which accounts for vastly different numbers of clusters that can be seen in different DNS-failure graphs. Such flexibility in terms of applicability to differing numbers of clusters improves matching clusters over time relative to methods such as the TNMF method, which unduly require that a uniform number of clusters be present across many days—despite the fact that, in reality, a uniform number of clusters are not always present across many days.

To detect domain-flux bots, host- and domain-name co-clustering is performed on each daily data set, as described above, and persistent clusters are then identified by linking the daily clusters over a longer period of time, e.g., three months. Suspicious domain-flux communities are those persistent clusters having a high proportion of new domain names. A time period of one day is generally selected as a unit of co-clustering (although other time periods are possible), since this period provides sufficient data for identifying community structures, while at the same time providing a reasonable degree of consistency in terms of host-to-IP address mapping. For DSL and cable-modem users, a significant proportion of inter-user switch times (i.e., times during which a single user can maintain its IP address) are longer than 2 days. Thus, given this consistency of IP addresses, it is possible to link IP-address clusters between neighboring days and identify those persistent clusters for further investigation.

In one embodiment, a linking algorithm links candidate clusters in adjacent time intervals based on shared IP addresses to form one or more cluster chains, and then identifies one or more cluster chains that are longer than a specified length threshold.

In this embodiment, linking is performed based on the number of shared IP addresses between neighboring days, as follows. Given two neighboring days, day 1 and day 2, for each IP-address cluster $c_1$ in day 1, the best match for that cluster $c_1$ during day 2 is found by identifying the cluster of day 2 that shares the most IP addresses with cluster $c_1$. It is also desirable to use a particular threshold $r_0$, where the shared number of IP addresses between the best-match cluster of day 2 and cluster $c_1$ is greater than threshold $r_0$. This threshold will vary, and different threshold values can be substituted (e.g., values from 0.1 to 0.8 in certain embodiments), depending on various factors, such as the characteristics of the malicious software agents being detected. If none of the clusters in day 2 shares more than $r_0$ IP addresses with cluster $c_1$, then it is determined that there is no match, and the linking for cluster $c_1$ ends. If a best-match cluster is found, then that cluster is denoted as cluster $c_2$. The method then proceeds to day 3 to find the best match for cluster $c_2$, and so forth. This process generates a cluster chain $c_1 \rightarrow c_2 \rightarrow c_3 \rightarrow \ldots$ by linking IP-address clusters across neighboring days until no best match can be found.

Among these identified cluster chains, those persistent IP clusters that last more than K days are identified for further investigation. At this point, domain-flux botnets can be distinguished from the other clusters using the following method.

A domain-flux botnet is expected to regenerate its associated domain names using its DGA algorithm periodically, usually every day. To characterize this, a metric called "freshness" is used. First, for each candidate cluster and for each of a plurality of time intervals (e.g., days) during the time period (e.g., three months), the number of new domain names appearing in the failed queries of the candidate cluster during the time interval is determined Then, for each candidate cluster, a freshness metric is generated based on the numbers of new domain names for the plurality of time intervals in the time period.

In one embodiment, the freshness metric is more specifically defined as follows. The variable $C_i \in C$ represents the co-clustering results after the linking algorithm has been fully executed, i.e., each $C_i$ represents a cluster chain that is persistent for T days (T>K), where T is a time period (e.g., one week) shorter than the time period (e.g., three months) represented by the clusters, and the variable $C_i^{(t)}$ represents co-cluster $C_i$ at time interval t. The variable $\mathcal{D}_{C_i}^{(t)}$ represents the set of domain names associated with the failed DNS queries from co-cluster $C_i^{(t)}$. The freshness for a particular cluster $C_i$ is then defined by the following Equation (2):

$$\text{freshness}(C_i) := \min_{t \in T} \frac{\left|\mathcal{D}_{C_i}^{(t)} - \left(\bigcup_{j=1}^{t-1} \mathcal{D}_{C_i}^{(j)}\right)\right|}{|\mathcal{D}_{C_i}^{(t)}|} \quad (2)$$

In Equation (2), for each time interval t in time period T, the following calculations are made for cluster $C_i$. The union set of all domain names in the cluster that were queried prior to time interval t is subtracted from the set of domain names queried during time interval t, resulting in a set that contains only domain names queried during time interval t but not prior to time interval t. Then, the number of domain names in the set that contains only domain names queried during time interval t but not prior to time interval t is divided by the number of domain names queried during time interval t, resulting in a fraction corresponding to time interval t. The minimum value of those fractions taken across all time intervals t in time period T is then assigned as the freshness value of cluster $C_i$, which is a value that will vary between 0 and 1.

A freshness value close to 1 indicates that almost all the associated failed domain names appearing in each time interval have never appeared in the past, while a freshness value close to 0 indicates that the hosts in the cluster are repeatedly querying the same set of domain names. Accordingly, a freshness value close to 1 captures the intrinsic workings of the DGA algorithm used by domain-flux bots, which generates new lists of domain names randomly from a huge list. These generated domain names are unlikely to repeat during the observation time period (e.g., three months). It is noted that freshness can be defined for time windows greater than one day, although using a slight modification, due to the fact that the exact time the bots' domain-name updates takes place is not known. For example, when the time window used is three days, three freshness values can be computed, one at the beginning of each of days 0, 1, and 2. Accordingly, the largest value among these three daily values is then chosen as the freshness value for the cluster Finally, those persistent clusters having a high value of freshness are selected as being highly likely to be domain-flux bots.

Once one or more domain-flux bots have been identified by domain-flux bot detector 602, domain-flux bot detector 602 provides IP addresses and/or domain names as feedback to C&C-server tracker 603, and possibly to reporting and alerting module 604 as well.

Using the feedback provided by domain-flux bot detector 602, C&C-server tracker 603 filters the common successful domain-name queries from DNS-success graph $\mathcal{G}_S$, so that only queries specific to those identified domain-flux bots, which are likely to be related to the C&C server, remain. In some embodiments, C&C-server tracker 603 further queries one or more DNS servers to identify one or more registrants of the domain names from the successful domain-name queries, based on the filtered version of DNS-success graph $\mathcal{G}_S$. C&C-server tracker 603 then provides a list of IP addresses and/or domain names from the successful queries, along with any registrant information found, to reporting and alerting module 604. Reporting and alerting module 604 uses the information provided by C&C tracker 603 and/or domain-flux bot detector 602 to generate reports and/or initiate alerts, such as email messages to a system or network administrator or a DNS registrar, containing, e.g., a list of IP addresses and/or domain names from the successful queries, along with any registrant information found that corresponds to the domain names.

Figure 10:
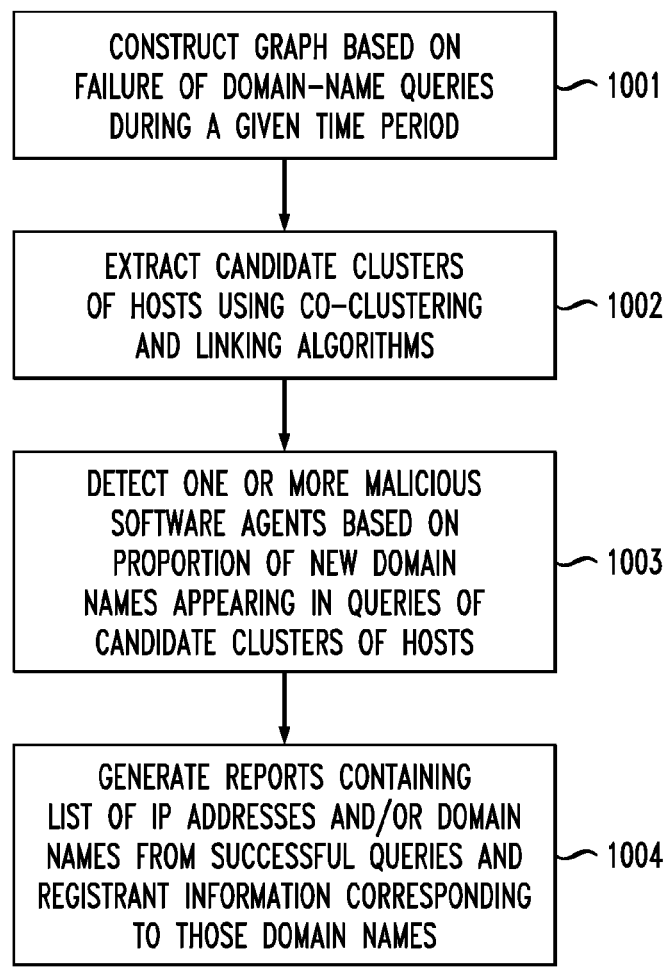
FIG. 10 is a flowchart showing an exemplary method for detecting flux-domain botnets consistent with one embodiment of the invention.

FIG. 10 is a flowchart showing an exemplary method for domain-flux bot detection, consistent with one embodiment of the invention. First, at step 1001, a graph is constructed based on the failure of a plurality of queries for domain names sent to one or more domain-name servers by a plurality of hosts during a given time period. Next, at step 1002, candidate clusters of hosts are extracted from the graph using co-clustering and linking algorithms. Next, at step 1003, one or more malicious software agents are detected based on the proportion of new domain names appearing in the failed domain-name queries of the candidate clusters of hosts. Finally, at step 1004, one or more reports are generated containing, e.g., a list of IP addresses and/or domain names from the successful queries, along with registrant information corresponding to those domain names.

Certain embodiments of the present invention are robust against one or more of the following three potential techniques that bot masters might take to evade being identified.

First, bot masters could use IP-address churn to avoid detection. However, a linking algorithm consistent with certain embodiments of the invention uses a core subset of IP addresses present in two neighboring (in time) co-clusters of a botnet. However, for a dynamic network (e.g., a campus wireless network), IP churn will make such an assumption invalid. Based on analyses of both university networks and large ISP networks, it has been found that, except for a large subset of hosts that use static IP addresses, around 60% of the hosts using dynamic addresses do not change their addresses within a day. (This might be due, e.g., to specific dynamic-address allocation strategies, to prevent breaking a customer's connection while the customer appears to be online.) Therefore, except for a few highly dynamic networks, e.g., dial-up networks, there will be a substantial subset of hosts that will have the same IP addresses across two consecutive time windows.

Second, bot masters could attempt to use as few invalid domain names as possible by registering all of the domain names in advance, e.g., using certain free (no-cost) domain-name registrars. However, it has been observed that, in practice, domain-flux botnets tend to use non-free domain-name registrars. (This might be because non-free domain names are more reliable and cannot be easily blocked or deleted, as is the case of domain names that are free to register.) Accordingly, registering all the domain names is actually costly and unnecessary, especially when the new domain-name list is sufficiently large to avoid being taken over by other attackers. A large number of failed domain-name queries is therefore an intrinsic and hence robust metric for characterizing domain-flux botnets.

Third, bot masters could query only a small subset of domain names. When a DGA algorithm generates a very large number of new domain names everyday, such as the Conficker-C DGA algorithm, which generates more than 50,000 domain names daily, each bot can query for only a small subset of the domain names, which can make finding correlations among the domain-name query failures difficult. However, this problem can be addressed by incorporating more samples and extending the observation time period. In addition, most DGA algorithms will generate only a moderate number of new domain names everyday to guarantee that the bots can find their C&C servers within a limited number of queries, while evading being identified by heavy-hitter detection-based methods.

When comparing detection results from certain embodiments of the present invention with known DGA algorithms, it has been shown that certain embodiments of the present invention can detect all known (and even some previously-unknown) domain-flux bots with a negligible number of false alarms. Certain embodiments of the present invention can also automatically detect domain-flux botnets, namely the set of bots and the set of domain names queried, based solely on DNS traces, and without requiring the reverse engineering of any specific DGA algorithms. A co-clustering algorithm consistent with certain embodiments of the present invention has been shown to be superior to existing co-clustering algorithms in term of domain-flux botnet detection, and a linking algorithm consistent with certain embodiments of the present invention can be used to track changes in clusters to differentiate domain-flux botnets from other correlated DNS behaviors.

The term "malicious software agents," as used herein, refers not only to botnets and their individual bots, but also to Trojan horses, spam email software, viruses, worms, software used for denial-of-service (DoS) attacks, and all other software that is (i) installed onto a user's computer without the user's knowledge or permission and/or (ii) designed to abuse computing resources, such as by using enormous amounts of bandwidth or preventing access to a server via a DoS attack. Accordingly, it should be understood that systems and methods consistent with certain embodiments of the present invention can be used to detect not only domain-flux botnets, but other malicious software agents as well. References to the detection of domain-flux botnets and bots should be understood to include the detection of any malicious software agent, and components of embodiments of the invention described herein that have names such as a "domain-flux bot detector" and a "command and control server tracker" should be construed more broadly as being a "malicious software agent detector" and a "malicious software agent server tracker," respectively, and the like.

Although specific examples of algorithms for co-clustering, linking clusters, and determining the freshness of a cluster are set forth herein, it should be understood that such algorithms are merely exemplary and that other algorithms could be used in other embodiments of the invention to perform similar or identical functions. For example, other embodiments of the invention could employ algorithms such as those disclosed in co-pending U.S. Provisional Patent Application Ser. No. 61/388,674, filed Oct. 1, 2010, which is incorporated herein by reference in its entirety.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Although certain embodiments of the invention might refer to specific time periods, e.g., one day or three months, it should be understood that time periods other than those stated in the specific embodiments described herein could be used in other embodiments of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

We claim:

1. A computer-implemented method for detecting malicious software agents, the method comprising:
   (a) constructing an association based on a plurality of failed queries for domain names sent to one or more domain-name servers by a plurality of hosts during a time period;
   (b) deriving, from the association, one or more candidate clusters of hosts;
   (c) determining, for each candidate cluster and for each of a plurality of time intervals during the time period, a number of new domain names appearing in the failed queries of the candidate cluster during the time interval;
   (d) determining, for each candidate cluster, a freshness metric based on the numbers of new domain names for the plurality of time intervals in the time period; and
   (e) detecting one or more malicious software agents on the hosts based on the one or more freshness metrics.

2. The invention of claim 1, wherein each host in each candidate cluster has at least a specified percentage of failed queries having at least first and second levels of domain names in common with at least one other host in the candidate cluster.

3. The invention of claim 1, wherein step (b) comprises:
   (b1) generating multi-level hierarchical groupings of Internet Protocol (IP) addresses in the association based on similarities between at least first and second levels of domain names in failed domain-name queries made by hosts corresponding to the IP addresses;
   (b2 determining, for each hierarchical grouping, a highest percentage of failed domain-name queries for which a most recently added IP address in the hierarchical grouping has at least first and second levels of domain names in common with another IP address in the hierarchical grouping; and
   (b3) identifying each highest-level hierarchical grouping having its determined percentage more than a specified percentage threshold as a candidate cluster of hosts.

4. The invention of claim 3, wherein the specified percentage threshold is 40%.

5. The invention of claim 1, wherein:
   step (b) comprises:
      (b1) linking candidate clusters in adjacent time intervals based on shared IP addresses to form one or more cluster chains; and
      (b2) identifying one or more cluster chains that are longer than a specified length threshold; and
   step (e) comprises determining that one or more of the identified cluster chains correspond to malicious software agents.

6. The invention of claim 1, further comprising:
   (f) constructing an association based on a plurality of successful queries for domain names sent to one or more domain-name servers by hosts on which one or more malicious software agents are detected in step (e); and
   (g) querying one or more domain-name servers to identify one or more registrants of domain names corresponding to the successful queries in the association constructed in step (f).

7. A computer-implemented method for detecting malicious software agents, the method comprising:
   (a) constructing an association based on a plurality of failed queries for domain names sent to one or more domain-name servers by a plurality of hosts during a time period;
   (b) deriving, from the association, one or more candidate clusters of hosts, wherein step (b) comprises:
      (b1) generating multi-level hierarchical groupings of Internet Protocol (IP) addresses in the association based on similarities between at least first and second levels of domain names in failed domain-name queries made by hosts corresponding to the IP addresses;
      (b2) determining, for each hierarchical grouping, a highest percentage of failed domain-name queries for which a most recently added IP address in the hierarchical grouping has at least first and second levels of domain names in common with another IP address in the hierarchical grouping; and
      (b3) identifying each highest-level hierarchical grouping having its determined percentage more than a specified percentage threshold as a candidate cluster of hosts; and
   (c) determining that one or more of the candidate clusters correspond to malicious software agents.

8. The invention of claim 7, wherein each host in each candidate cluster has at least a specified percentage of failed queries having at least first and second levels of domain names in common with at least one other host in the candidate cluster.

9. The invention of claim 7, wherein the specified percentage threshold is 40%.

10. The invention of claim 7, wherein:
    step (b) further comprises:
       (b4) linking candidate clusters in adjacent time intervals based on shared IP addresses to form one or more cluster chains; and
       (b5) identifying one or more cluster chains that are longer than a specified length threshold; and
    step (c) comprises determining that one or more of the identified cluster chains correspond to malicious software agents.

11. The invention of claim 7, further comprising:
    (d) constructing an association based on a plurality of successful queries for domain names sent to one or more domain-name servers by hosts on which one or more malicious software agents are detected in step (c); and
    (e) querying one or more domain-name servers to identify one or more registrants of domain names corresponding to the successful queries in the association constructed in step (d).

12. A computer-implemented method for detecting malicious software agents, the method comprising:
    (a) constructing an association based on a plurality of failed queries for domain names sent to one or more domain-name servers by a plurality of hosts during a time period;
    (b) deriving, from the association, one or more candidate clusters of hosts for each of a plurality of time intervals in the time period;
    (c) linking candidate clusters in adjacent time intervals based on shared IP addresses to form one or more cluster chains;
    (d) identifying one or more cluster chains that are longer than a specified length threshold; and
    (e) determining that one or more of the identified cluster chains correspond to malicious software agents.

13. The invention of claim 12, wherein each host in each candidate cluster has at least a specified percentage of failed queries having at least first and second levels of domain names in common with at least one other host in the candidate cluster.

14. The invention of claim 12, wherein:
    step (b) comprises:
    (b1) generating multi-level hierarchical groupings of Internet Protocol (IP) addresses in the association based on similarities between at least first and second levels of domain names in failed domain-name queries made by hosts corresponding to the IP addresses;
    (b2) determining, for each hierarchical grouping, a highest percentage of failed domain-name queries for which a most recently added IP address in the hierarchical grouping has at least first and second levels of domain names in common with another IP address in the hierarchical grouping; and
    (b3) identifying each highest-level hierarchical grouping having its determined percentage more than a specified percentage threshold as a candidate cluster of hosts; and
    step (e) comprises:
    (e1) determining, for each cluster chain identified in step (d) and for each of a plurality of time intervals during the time period, a number of new domain names appearing in the failed queries of the cluster chain during the time interval;
    (e2) determining, for each cluster chain, a freshness metric based on the numbers of new domain names for the plurality of time intervals in the time period; and
    (e3) detecting one or more malicious software agents on the hosts based on the one or more freshness metrics.

15. The invention of claim 14, wherein the specified percentage threshold is 40%.

16. The invention of claim 12, further comprising:
    (f) constructing an association based on a plurality of successful queries for domain names sent to one or more domain-name servers by hosts on which one or more malicious software agents are detected in step (e); and
    (g) querying one or more domain-name servers to identify one or more registrants of domain names corresponding to the successful queries in the association constructed in step (f).

17. Apparatus for detecting malicious software agents, comprising:
    a query pre-processor adapted to construct a graph based on a plurality of failed queries for domain names sent to one or more domain-name servers by a plurality of hosts during a time period;
    a malicious software agent detector adapted to:
    (i) derive, from the graph, one or more candidate clusters of hosts;
    (ii) determine, for each candidate cluster and for each of a plurality of time intervals during the time period, a number of new domain names appearing in the failed queries of the candidate cluster during the time interval; and
    (iii) determine, for each candidate cluster, a freshness metric based on the numbers of new domain names for the plurality of time intervals in the time period; and
    a malicious software agent server tracker adapted to detect one or more malicious software agents on the hosts based on the one or more freshness metrics,
    wherein at least one of the query pre-processor, the malicious software agent detector, and the malicious software agent server tracker is implemented in a hardware processor.

18. Apparatus for detecting malicious software agents, comprising:
    a query pre-processor adapted to construct a graph based on a plurality of failed queries for domain names sent to one or more domain-name servers by a plurality of hosts during a time period;
    a malicious software agent detector adapted to derive, from the graph, one or more candidate clusters of hosts, wherein the deriving comprises:
    (i) generating multi-level hierarchical groupings of Internet Protocol (IP) addresses in the graph based on similarities between at least first and second levels of domain names in failed domain-name queries made by hosts corresponding to the IP addresses;
    (ii) determining, for each hierarchical grouping, a highest percentage of failed domain-name queries for which a most recently added IP address in the hierarchical grouping has at least first and second levels of domain names in common with another IP address in the hierarchical grouping; and
    (iii) identifying each highest-level hierarchical grouping having its determined percentage more than a specified percentage threshold as a candidate cluster of hosts; and
    a malicious software agent server tracker adapted to determine that one or more of the candidate clusters correspond to malicious software agents,
    wherein at least one of the query pre-processor, the malicious software agent detector, and the malicious software agent server tracker is implemented in a hardware processor.

19. Apparatus for detecting malicious software agents, comprising:
    a query pre-processor adapted to construct a graph based on a plurality of failed queries for domain names sent to one or more domain-name servers by a plurality of hosts during a time period;
    a malicious software agent detector adapted to:
    (i) derive, from the graph, one or more candidate clusters of hosts for each of a plurality of time intervals in the time period;
    (ii) link candidate clusters in adjacent time intervals based on shared IP addresses to form one or more cluster chains; and
    (iv) identify one or more cluster chains that are longer than a specified length threshold; and
    a malicious software agent server tracker adapted to determine that one or more of the identified cluster chains correspond to malicious software agents,
    wherein at least one of the query pre-processor, the malicious software agent detector, and the malicious software agent server tracker is implemented in a hardware processor.

20. The method of claim 1, wherein step (d) comprises:
    (d1) comparing, for each of one or more time intervals, domain names queried during said each time interval with domain names queried prior to that time interval; and
    (d2) identifying, as new domain names, one or more domain names queried during the time interval but not prior to the time interval.

* * * * *